US008556299B2

(12) United States Patent
Suto et al.

(10) Patent No.: US 8,556,299 B2
(45) Date of Patent: Oct. 15, 2013

(54) INFORMATION RECORDING PATCH, PRINTED SHEET, AND AUTHENTICITY DISCRIMINATION METHOD THEREFOR

(75) Inventors: Noriyuki Suto, Kanagawa-Ken (JP); Kenichi Kimura, Odawara (JP)

(73) Assignee: National Printing Bureau, Incorporated Administrative Agency, Tokyo-To (JP)

( * ) Notice: Subject to any disclaimer, the term of this patent is extended or adjusted under 35 U.S.C. 154(b) by 1139 days.

(21) Appl. No.: 12/223,459

(22) PCT Filed: Jan. 31, 2007

(86) PCT No.: PCT/JP2007/051616

§ 371 (c)(1), (2), (4) Date: Jul. 31, 2008

(87) PCT Pub. No.: WO2007/088899

PCT Pub. Date: Aug. 9, 2007

(65) Prior Publication Data

US 2009/0033085 A1 Feb. 5, 2009

(30) Foreign Application Priority Data

Feb. 3, 2006 (JP) .................................. 2006-26652

(51) Int. Cl.
*B42D 15/00* (2006.01)
*G09C 3/00* (2006.01)
*B42D 15/10* (2006.01)

(52) U.S. Cl.
USPC .................. 283/94; 283/72; 283/74; 283/75; 283/81; 283/82; 283/86; 283/91; 283/98; 283/901

(58) Field of Classification Search
USPC .......... 283/70, 72, 74, 75, 81, 82, 86, 91, 94, 283/98, 901
See application file for complete search history.

(56) References Cited

U.S. PATENT DOCUMENTS 5,331,443 A 7/1994 Stanisci
6,036,807 A 3/2000 Brongers (Continued)

FOREIGN PATENT DOCUMENTS

JP 7-306963 A 11/1995
JP 2001-172897 A 6/2001

(Continued)

*Primary Examiner* — Dana Ross
*Assistant Examiner* — Justin V Lewis
(74) *Attorney, Agent, or Firm* — Birch, Stewart, Kolasch & Birch, LLP

(57) ABSTRACT

This invention provides an information recording patch that allows accurate authenticity discrimination, a printed sheet, and an authenticity discrimination method therefor. An information recording patch includes a protective layer (1), intermediate layer (2), metal layer (3), and adhesive layer (4). The protective layer (1) made of a material having a predetermined dielectric constant is arranged at the uppermost layer. The intermediate layer (2) made of a material having a predetermined dielectric constant has, on its surface, a three-dimensional pattern corresponding to the design of a hologram forming layer including the intermediate layer and the metal layer. The metal layer (3) made of a material having a predetermined conductivity is arranged on the three-dimensional surface of the intermediate layer to form a conductive film. A mirror surface having a three-dimensional pattern, which is formed by the metal layer and the intermediate layer, serves as the main component of the image of the hologram forming layer. The adhesive layer (4) made of a material having a predetermined dielectric constant has the characteristic of a dielectric of itself. When this information recording patch was measured using a leakage microwave sensor, the detected voltage exhibited "medium level" in the conductive region of the metal layer and "low level" in the remaining regions.

15 Claims, 22 Drawing Sheets

(56) References Cited

U.S. PATENT DOCUMENTS

| | | | | |
|---|---|---|---|---|
| 6,930,606 | B2 * | 8/2005 | Crane et al. | 283/82 |
| 2001/0021474 | A1 | 9/2001 | Hamada | |
| 2004/0239097 | A1 * | 12/2004 | Boehm et al. | 283/57 |
| 2005/0104364 | A1 * | 5/2005 | Keller et al. | 283/72 |

FOREIGN PATENT DOCUMENTS

| | | | |
|---|---|---|---|
| JP | 2002-348799 | A | 12/2002 |
| JP | 2002348799 | A * | 12/2002 |
| JP | 2005-265725 | A | 9/2005 |

* cited by examiner

| VOUCHER TYPE | DETECTION DATA | | | | |
|---|---|---|---|---|---|
| | a | b | c | d | e |
| ¥10000 | 1 | 0 | 0 | 0 | 0 |
| ¥5000 | 0 | 1 | 0 | 0 | 0 |
| ¥1000 | 0 | 0 | 1 | 0 | 0 |

INFORMATION RECORDING PATCH, PRINTED SHEET, AND AUTHENTICITY DISCRIMINATION METHOD THEREFOR

TECHNICAL FIELD

The present invention relates to an information recording patch, a printed sheet, and an authenticity discrimination method therefor.

BACKGROUND ART

An example of a patch formed by partially adhering a metal to a resin base material is a demetallized OVD. The recent mainstream of OVD forgery uses a metallization technique. Hence, a demetallized OVD is used to apply, to an OVD, a complex outline or minute pattern which is difficult to apply by metallization. For this reason, the demetallized OVD is employed in security products such as banknotes as a visual authenticity discrimination technique.

There are also many security products having a metal foil other than an OVD. In this case as well, the demetallization technique of partially adhering a metal to a resin base material to form a structure is used in the security products.

However, to accurately discriminate the authenticity of a security product such as a banknote, it is necessary to mechanically discriminate the authenticity of a patch such as a demetallized OVD formed by partially adhering a metal to a resin base material. Conventionally, to mechanically discriminate the authenticity of a patch, for example, a hologram having information embedded has been proposed (see, e.g., non-patent reference 1 to be described later). This technique directly forms a submicron structure on a metal surface by using a laser, thereby imparting unique information. This technique is used to identify a product sales route as a measure against, e.g., counterfeit name-brand products.

To inspect a printed product having a diffraction grating or hologram foil, a technique has been disclosed in which, for example, a metal coating is formed on the base material of a security thread by, e.g., vacuum deposition, chemical etching, or laser etching and partially removed in a repetitive pattern. A paper sheet having the security thread is passed through, e.g., a microwave detector, and the repetitive pattern of the security thread is compared with the pattern of an authentic printed product, thereby discriminating the authenticity (e.g., patent reference 1).

Security threads in the past are used to only detect whether a security thread is present, or whether a text is present on a security thread, i.e., the security thread is partially removed. However, the above-described technique takes a step forward and places focus on a fact that a security thread whose metal coating is partially removed in a repetitive pattern generates a predetermined microwave detected voltage waveform pattern. The microwave detected voltage waveform pattern is compared with that of an authentic printed product, thereby discriminating the authenticity.

There is also provided a security thread having a magnetic layer and a conductive layer on a base material, in which the conductive layer includes a conductive portion with a relatively high microwave detected voltage, and the conductive portion with the relatively high microwave detected voltage and magnetic data recorded in the magnetic layer are arranged in a predetermined positional relationship, thereby preventing any magnetic data reading error caused by a relative shift between the security thread and the printed product (e.g., patent reference 2).

This technique prevents any reading error of a machine regardless of a phase shift, allows not only the magnetic layer but also the conductive layer to carry transmittable data, and prevents any reading error in the forward and reverse directions.

There is also provided a metal deposited thermal transfer hologram sheet in which a metal deposition layer, or a metal layer and a thermal adhesive layer formed in advance are partially removed in a slit or mesh by laser machining, and a transparent or semitransparent pseudo hologram is formed in a region including the removed portion, and a method of processing the same (e.g., patent reference 3).

Non-patent reference 1: Proceedings of SPIE Vol. 4677 (2002), Direct Write method to create DOVIDs in metal surfaces Patent reference 1: Japanese Patent No. 2906352 (Pages 1 to 5, FIGS. 1 to 4)

Patent reference 2: Japanese Patent Laid-Open No. 2002-348799 (Page 1, FIG. 1)

Patent reference 3: Japanese Patent Laid-Open No. 2003-226085

DISCLOSURE OF INVENTION

In the mechanical authenticity discrimination method described in non-patent reference 1, the unit cost per sheet is as very expensive as 1 dollar. Additionally, in a mechanical process in, e.g., a vending machine, mechanical authenticity discrimination is difficult because of, e.g., a flutter of paper during conveyance.

In the technique disclosed in patent reference 1, a stable thread whose metal coating is partially removed in a repetitive pattern generates a predetermined microwave detected voltage waveform pattern. However, since the thread is formed from two kinds of regions, i.e., a portion with a conductive portion and an non-removed portion, only a change in an analog voltage based on the presence/absence of conductivity is obtained from the detected voltage waveform. It is therefore difficult to accurately discriminate the authenticity by calculating on the basis of the waveform pattern. In addition, if the waveform pattern contains conveyance disturbance or noise, the discrimination becomes more inaccurate.

In the technique described in patent reference 2, a conductive portion with a relatively high microwave detected voltage is formed in the conductive layer to obtain a high microwave detected voltage, thereby making the conductive layer carry data and preventing any magnetic data reading error.

In the technique disclosed in patent reference 3, the reverse surface of the metal deposited thermal transfer hologram sheet is seen through in the region that has undergone the removal process so that the hologram sheet functions as a pseudo transparent sheet. The remaining portion of the metal deposited layer holds the hologram effect. However, if the metal deposited thermal transfer hologram sheet is to be thermally transferred to a medium, alignment is necessary so that predetermined information described on the medium can be seen through.

However, if this technique is used as a mechanical reading element such as a hologram, the hologram or the like is pasted to the surface of a paper sheet for the purpose of visually recognizing an optical change. This may facilitate forgery or data alteration by cutting and pasting a similar aluminum foil to the surface of a paper sheet.

The present invention has been made in consideration of the above situation, and has as its object to provide an information recording patch that allows accurate authenticity discrimination, a printed sheet, and an authenticity discrimination method therefor.

According to the present invention, there is provided an information recording patch characterized by comprising, on a surface of a resin base material, at least one conductor adhered region and at least one conductor non-adhered region, wherein the at least one conductor adhered region has a long side whose length is $\frac{1}{2}^n$ (n is an integer: n≥0) of a predetermined wavelength.

The conductor adhered region preferably has an anisotropic shape.

The conductor adhered region may have a rectangular shape or an elliptical shape.

The conductor adhered region may comprise a plurality of conductor adhered regions which are arranged while sandwiching the conductor non-adhered region.

The conductor adhered region may comprise a plurality of conductor adhered regions which are arranged in a grid pattern while sandwiching the conductor non-adhered region.

The conductor adhered region may comprise a plurality of conductor adhered regions, and at least one of the conductor adhered regions, which has a long side whose length is not $\frac{1}{2}^n$ (n is an integer: n≥0) of the predetermined wavelength, may be arranged around the conductor adhered region having the long side whose length is $\frac{1}{2}^n$ (n is an integer: n≥0) of the predetermined wavelength while sandwiching the conductor non-adhered region.

The conductor adhered region may comprise a plurality of conductor adhered regions, and the conductor adhered regions, each of which has a long side whose length is not $\frac{1}{2}^n$ (n is an integer: n≥0) of the predetermined wavelength, may be arranged around the conductor adhered region having the long side whose length is $\frac{1}{2}^n$ (n is an integer: n≥0) of the predetermined wavelength while sandwiching the conductor non-adhered region.

A hologram may be formed in at least one of the conductor adhered regions.

According to the present invention, there is also provided a printed sheet characterized by comprising a sheet to which the above information recording patch is pasted.

According to the present invention, there is also provided an authenticity discrimination method for an information recording patch, characterized by comprising the steps of:

leaking a microwave having a predetermined wavelength from a leakage hole of a waveguide;

conveying the information recording patch so as to make the information recording patch face the leakage hole;

measuring influence, on the microwave, of each of a conductive characteristic of the conductor adhered region and a nonconductive characteristic of the base material and the conductor non-adhered region in the information recording patch by receiving the microwave in the waveguide and measuring a voltage; and discriminating authenticity of the information recording patch by comparing a measurement result of the received voltage with a received voltage obtained upon measuring an authentic information recording patch.

In the step of leaking the microwave having the predetermined wavelength from the leakage hole of the waveguide, a peak of the microwave is preferably leaked.

The method may further comprise the step of, after measuring the influence on the microwave, measuring a voltage waveform using one of an optical sensor, a capacitance sensor, and an eddy current sensor, and in the step of discriminating the authenticity of the information recording patch, the authenticity may be discriminated by comparing the voltage waveform with a voltage obtained by receiving the microwave in the waveguide.

The method may further comprise the step of, after measuring the influence on the microwave, irradiating the information recording patch with near infrared light and measuring a light amount waveform of the near infrared light transmitted through the information recording patch, and in the step of discriminating the authenticity of the information recording patch, the authenticity may be discriminated by comparing the light amount waveform with a voltage obtained by receiving the microwave in the waveguide.

The method may further comprise the step of, after measuring the influence on the microwave, irradiating the information recording patch with near infrared light and measuring a light amount waveform of the near infrared light transmitted through the information recording patch, and in the step of discriminating the authenticity of the information recording patch, the authenticity may be discriminated by comparing a non-transmittance characteristic of light obtained from the light amount waveform with a shielding characteristic of a radio wave obtained from a voltage obtained by receiving the microwave in the waveguide.

According to the information recording patch, printed sheet, and authenticity discrimination method therefor of the present invention, it is possible to accurately discriminate the authenticity.

DESCRIPTION OF THE REFERENCE NUMERALS

Figure 1:
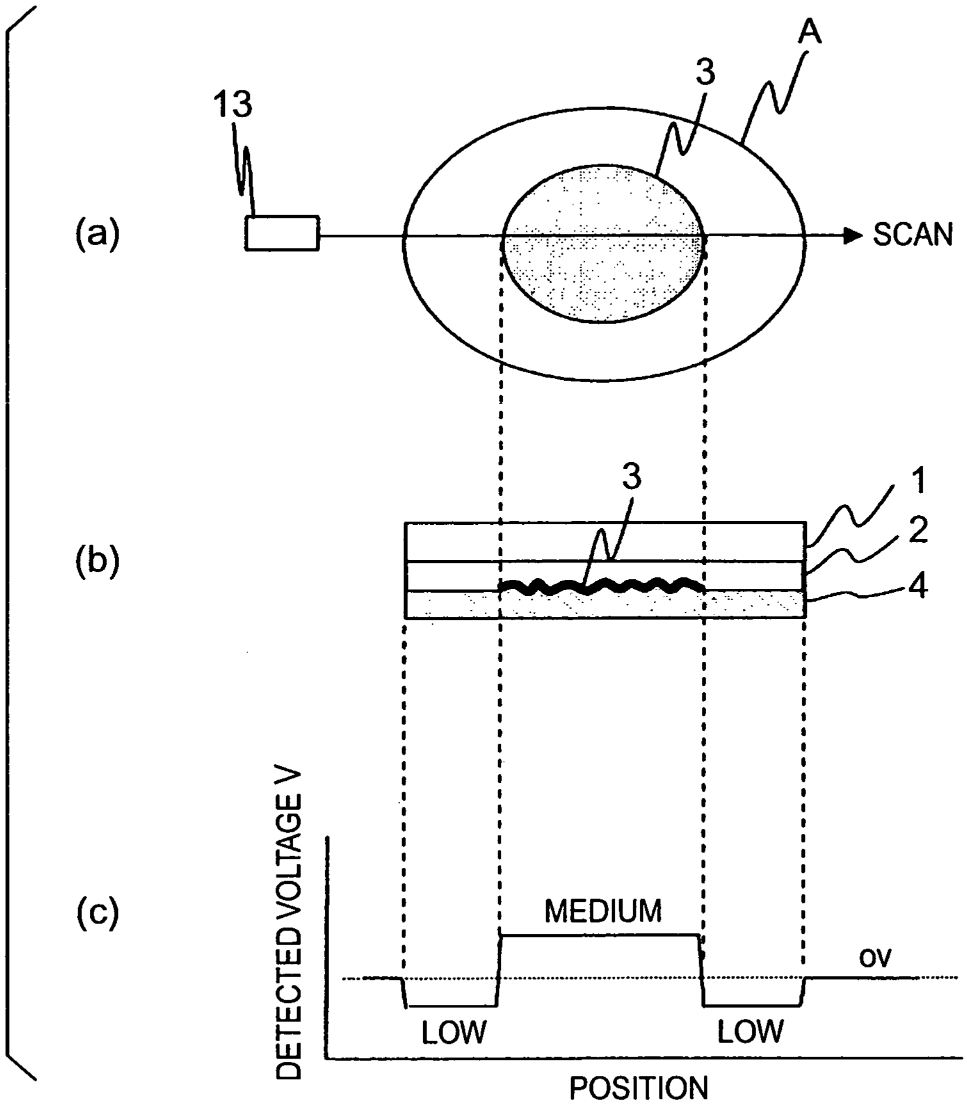
FIG. 1 shows explanatory views of the structure of an information recording patch and a detected voltage according to the first embodiment of the present invention.

1 protective layer
2 intermediate layer
3 metal layer
4 adhesive layer
5, 5' first metal layer
6 second metal layer
7 nonconductive region
8 waveguide
9 irradiation means
10 receiving means
11 leakage hole
12 target measurement object
13 leakage microwave sensor
14 reflecting plate
15 electromagnetic wave
16 magnetic field distribution
17 electric field distribution
18 transmitting antenna
19 receiving antenna
20 microwave transmitting/receiving unit
21 receiving antenna
22 receiving diode
23 identification card
24 forged product of identification card
25 ink layer
26 base material layer
27 aluminum foil etc.
28 conveyor
29 oscilloscope
30 cash voucher
31 paper sheet
32 discrimination label
101 first conductive region
102 second conductive region
103 leakage microwave sensor
104 protective layer
105 intermediate layer
106 metal layer
107 adhesive layer
112 oscilloscope
123 identification card
124 base material
125 ink layer
126, 131 information recording patch
127 conveyor
128 forged product
129 color copy layer
130 aluminum foil
132 eddy current sensor
133 transmission infrared sensor

BEST MODE FOR CARRYING OUT THE INVENTION

An information recording patch, printed sheet, and authenticity discrimination method therefor according to several embodiments of the present invention will now be described with reference to the accompanying drawings.

"Information recording patch" is an information recording medium carrying information and is used as a general term for a technique of optically expressing an image using an optical diffraction structure (OVD: Optical Variable Device) such as a holographic image or diffraction grating image and a structure including a metal foil and the like.

Examples of anisotropic shapes are a rectangle and an ellipse. In these shapes, when the longest portion is designed to be $\frac{1}{2}^n$ (n is an integer: $n \geq 0$) of a wavelength, a large current flows along the lengthwise direction, and resonance is obtained. Examples of non-anisotropic shapes are a square and a perfect circle. These shapes are symmetrical in all directions and have no portion to flow a large current. It is therefore difficult to obtain resonance.

The information recording patch and the printed sheet according to the embodiment are an information recording patch formed by partially adhering a metal to a resin base material and a security product formed by pasting it to a printed sheet such as a paper sheet. The authenticity discrimination method detects the resonance characteristic and shielding characteristic of the metal adhered region of the patch, and the dielectric characteristic of the metal non-adhered region of the patch and the printed sheet using a leakage wave from the leakage hole of a waveguide which generates a standing wave, thereby discriminating the authenticity of the security product.

FIG. 1(*a*) shows the planar structure of an information recording patch according to the first embodiment. FIG. 1(*b*) shows the longitudinal sectional structure.

An information recording patch A has a conductive region and a dielectric region and includes a protective layer 1, intermediate layer 2, metal layer 3, and adhesive layer 4. The intermediate layer 2 is embossed. The intermediate layer 2 and the metal layer 3 stacked on it form a hologram layer. Since the metal layer 3 is formed on the surface of the intermediate layer 2 with the three-dimensional pattern, the hologram has a function of generating an image that optically changes in accordance with the three-dimensional pattern when light that has entered from the protective layer side is visually recognized as it is reflected by the metal layer 3 and passes through the protective layer 1 again.

In this embodiment, the shape of the three-dimensional pattern of the intermediate layer 2 and the degree of the optical change do not influence mechanical reading. Hence, a detailed description of the optical change will be omitted. If the intermediate layer 2 has no three-dimensional pattern, the intermediate layer 2 and the metal layer 3 which are simply stacked do not serve as a hologram having the function of causing an optical change. However, they have the function of an information recording medium and are usable as an information recording patch by a metal foil.

The layers included in the information recording patch according to this embodiment will be described next.

In the information recording patch A, the protective layer 1, intermediate layer 2, and adhesive layer 4 use dielectrics having predetermined dielectric constants. The metal layer 3 uses a conductive material having a predetermined conductivity. In this embodiment, the metal layer 3 is arranged in a circular shape in the conductive region. The protective layer 1, intermediate layer 2, and adhesive layer 4 are arranged in an elliptical shape larger than the metal layer 3.

FIG. 1(*c*) shows a detected voltage upon reading, using a sensor, the information recording patch A pasted to, e.g., an article of value via the adhesive layer.

The detected voltage in the dielectric region corresponding to the portion of the protective layer 1, intermediate layer 2, and adhesive layer 4 arranged in an elliptical shape larger than the metal layer 3 has a level lower than 0 V of the base. The detected voltage in the conductive region corresponding to the metal layer portion has a level higher than 0 V of the base.

Hence, in confirming the authenticity of the information recording patch pasted to, e.g., an article of value, the information recording patch can be discriminated as authentic only when two conditions are satisfied upon reading using the sensor: the elliptical dielectric region is detected, and the circular conductive region is detected at a predetermined position in the ellipse.

In this embodiment, the dielectric region that forms the information recording patch is elliptic, and the conductive region is circular. However, the present invention is not limited to this, and they can have any shape as far as the conductive region is surrounded by the dielectric region. The two regions may be adjacent to each other.

Figure 2:
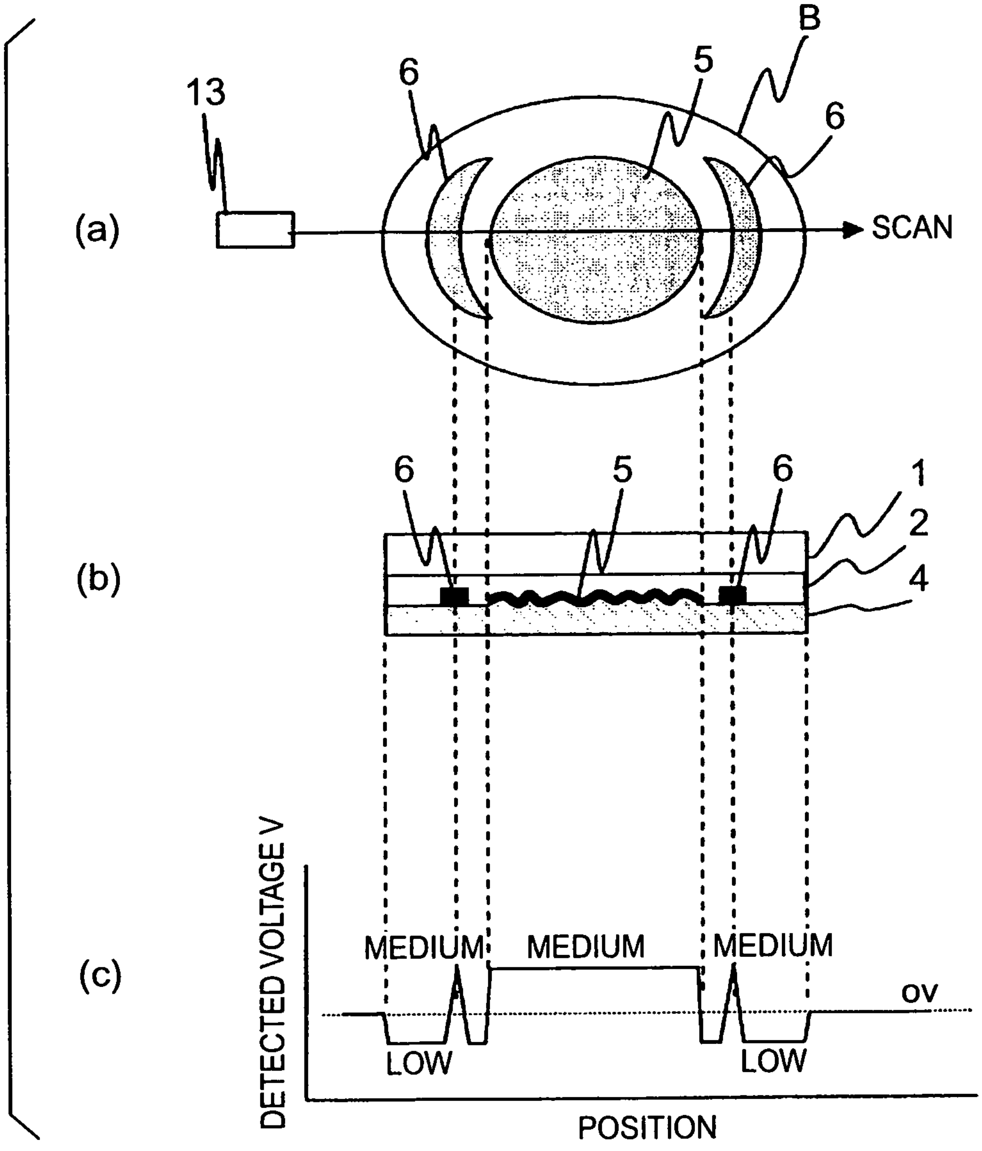
FIG. 2 shows explanatory views of the structure of an information recording patch and a detected voltage according to the second embodiment of the present invention.

FIGS. 2(*a*) and 2(*b*) show the structure of an information recording patch according to the second embodiment.

An information recording patch B has conductive regions and a dielectric region and includes a protective layer 1, intermediate layer 2, metal layers 5 and 6, and adhesive layer 4. The protective layer 1, intermediate layer 2, and adhesive layer 4 use dielectrics having predetermined dielectric constants. The metal layers use a conductive material having a predetermined conductivity.

In this embodiment, metal layers are arranged in two kinds of shapes. The first metal layer 5 is arranged in a circular shape in the conductive region, whereas the second metal layers 6 are arranged in a crescent shape on both sides of the first metal layer 5. The protective layer 1, intermediate layer 2, and adhesive layer 4 are arranged in an elliptical shape larger than the metal layers. That is, in this embodiment, a total of three metal layers, i.e., one circular shape and two crescent shapes are arranged in the conductive regions.

FIG. 2(*c*) shows detected voltages upon reading, using a sensor, the information recording patch B pasted to, e.g., an article of value via the adhesive layer. The detected voltage in the dielectric region corresponding to the portion of the protective layer 1, intermediate layer 2, and adhesive layer 4 arranged in an elliptical shape larger than the first metal layer 5 and the second metal layers 6 has a level lower than 0 V of the base. The detected voltages in the conductive regions corresponding to the first and second metal layer portions have the same level higher than 0 V of the base.

Hence, in confirming the authenticity of the information recording patch, the information recording patch can be discriminated as authentic only when three conditions are satisfied upon reading using the sensor: the elliptical dielectric region is detected, the circular conductive region is detected at a predetermined position in the ellipse, and crescent conductive regions are detected at predetermined positions in the ellipse.

Figure 3:
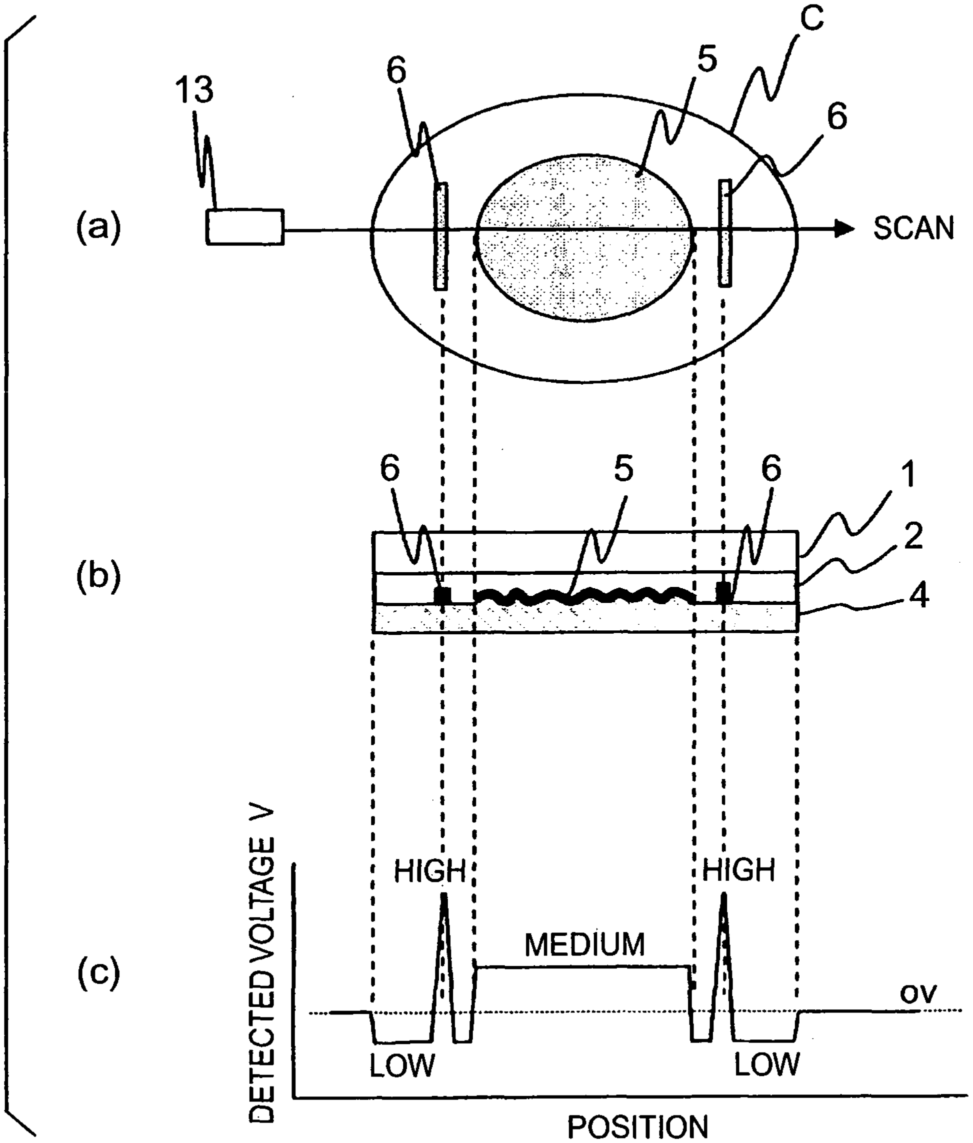
FIG. 3 shows explanatory views of the structure of an information recording patch and a detected voltage according to the third embodiment of the present invention.

FIGS. 3(*a*) and 3(*b*) show the structure of an information recording patch according to the third embodiment. An information recording patch C has conductive regions and a dielectric region and includes a protective layer 1, intermediate layer 2, metal layers 5 and 6, and adhesive layer 4. The protective layer 1, intermediate layer 2, and adhesive layer 4 use dielectrics having predetermined dielectric constants. The metal layers 5 and 6 use a conductive material having a predetermined conductivity.

In this embodiment, metal layers are arranged in two kinds of shapes. The first metal layer 5 is arranged in a circular shape in the conductive region, whereas the second metal layers 6 are arranged, on both sides of the first metal layer 5, in a shape having a width and length that cause resonance with a predetermined frequency upon measuring using a microwave sensor. The protective layer 1, intermediate layer 2, and adhesive layer 4 are arranged in an elliptical shape larger than the metal layers.

To make the second metal layers 6 resonate with a predetermined frequency, the length of the long side must be $\frac{1}{2}^n$ (n is an integer: n≥0) of a predetermined wavelength.

To cause resonance, the second metal layer 6 preferably has an anisotropic shape such as a rectangular or elliptical shape.

That is, in this embodiment, a total of three metal layers, i.e., one circular shape and two shapes each having a width and length that cause resonance with a frequency are arranged in the conductive regions.

FIG. 3(*c*) shows detected voltages upon reading, using a sensor, the information recording patch C pasted to, e.g., an article of value via the adhesive layer. The detected voltage in the dielectric region corresponding to the portion of the protective layer 1, intermediate layer 2, and adhesive layer 4 arranged in an elliptical shape larger than the metal layers 5 and 6 has a level lower than 0 V of the base. The detected voltage in the conductive region of the first metal layer 5 has a level higher than 0 V of the base. The detected voltage in the conductive region of each second metal layer 6 has a level higher than that of the first metal layer 5.

Hence, in confirming the authenticity of the information recording patch, the information recording patch can be discriminated as authentic only when three conditions are satisfied upon reading using the sensor: the elliptical dielectric region is detected, the circular conductive region is detected at a predetermined position in the ellipse, and the two conductive regions each having a width and length that cause resonance with the frequency of the sensor are detected at predetermined positions in the ellipse.

Figure 4:
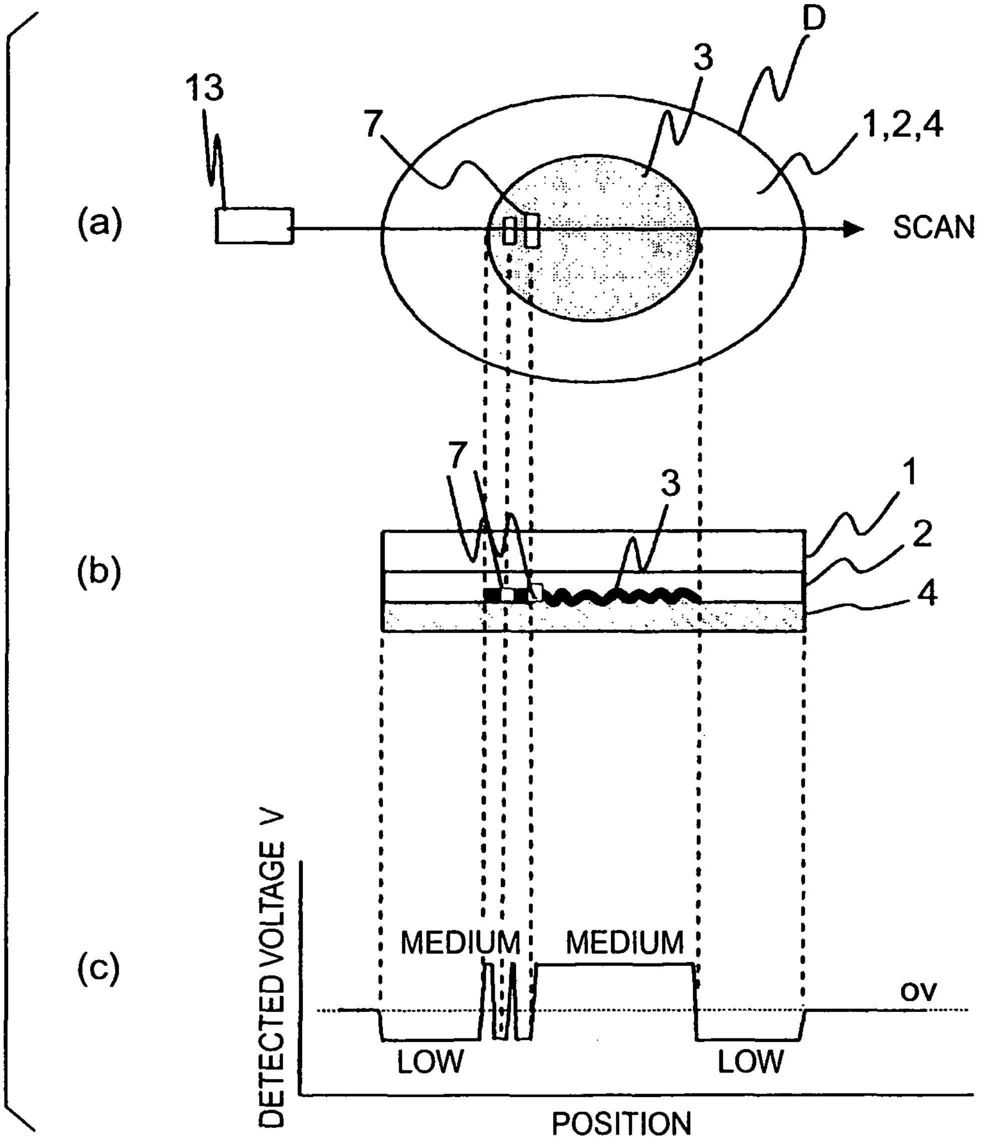
FIG. 4 shows explanatory views of the structure of an information recording patch and a detected voltage according to the fourth embodiment of the present invention.

FIGS. 4(*a*) and 4(*b*) show the structure of an information recording patch according to the fourth embodiment. An information recording patch D includes a protective layer 1, intermediate layer 2, metal layer 3, and adhesive layer 4. The protective layer 1, intermediate layer 2, and adhesive layer 4 use dielectrics having predetermined dielectric constants. The metal layer 3 uses a conductive material having a predetermined conductivity.

In this embodiment, the metal layer is arranged in a circular shape in the conductive region while including nonconductive regions 7 formed by partially removing the metal layer 3. The protective layer 1, intermediate layer 2, and adhesive layer are arranged in an elliptical shape larger than the metal layer 3. The portions of the nonconductive regions 7 in the metal layer 3 are made of only dielectrics.

FIG. 4(*c*) shows detected voltages upon reading, using a sensor, the information recording patch D pasted to, e.g., an article of value via the adhesive layer. The detected voltage in the dielectric region corresponding to the portion of the protective layer 1, intermediate layer 2, and adhesive layer 4 arranged in an elliptical shape larger than the metal layer 3 has a level lower than 0 V of the base. The detected voltage of the metal layer 3 has a level higher than 0 V of the base. The detected voltage of each nonconductive region 7 in the metal layer 3 has the same level as in the dielectric region that is lower than 0 V of the base.

Hence, in confirming the authenticity of the information recording patch, the information recording patch can be discriminated as authentic only when three conditions are satisfied upon reading using the sensor: the elliptical dielectric region is detected at a predetermined position, the circular conductive region is detected at a predetermined position in the ellipse, and the dielectric regions corresponding to the nonconductive regions are detected at predetermined positions in the circle.

Figure 5:
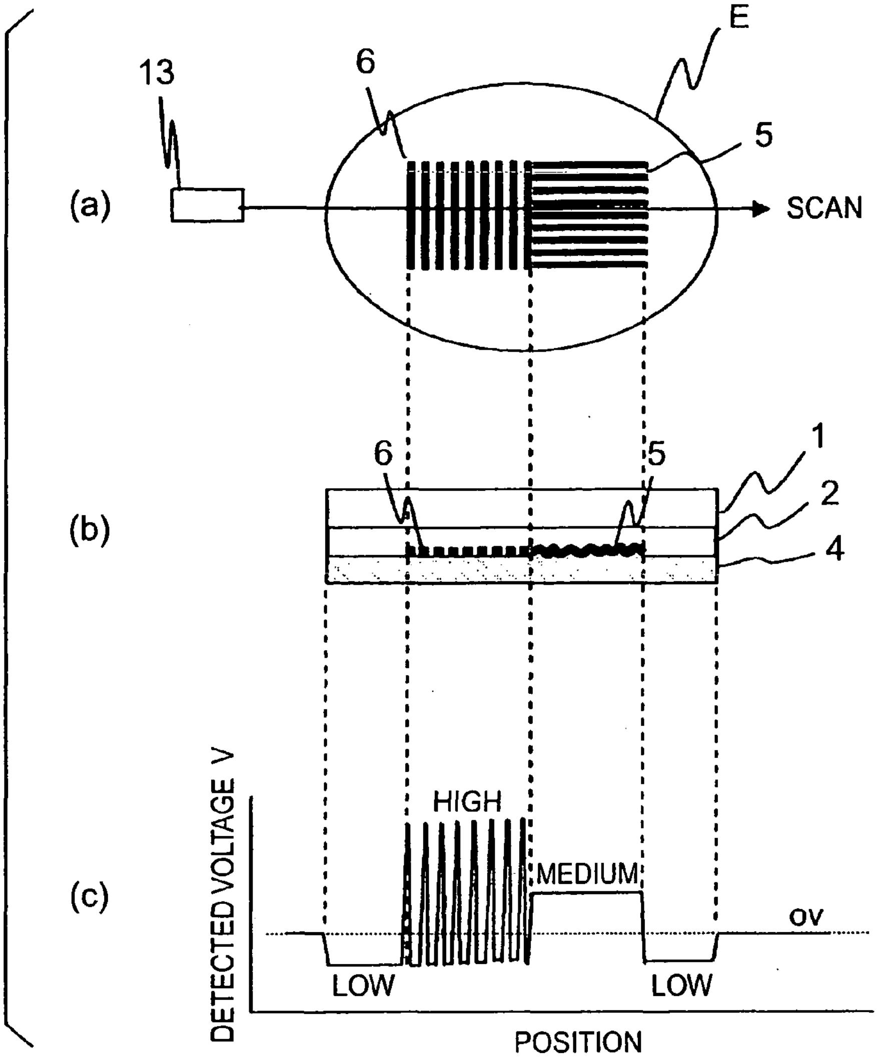
FIG. 5 shows explanatory views of the structure of an information recording patch and a detected voltage according to the fifth embodiment of the present invention.

FIG. 5 shows the structure of an information recording patch according to the fifth embodiment. An information recording patch E shown in FIGS. 5(*a*) and 5(*b*) includes a protective layer 1, intermediate layer 2, metal layers 5 and 6, and adhesive layer 4. The protective layer 1, intermediate layer 2, and adhesive layer 4 use dielectrics having predetermined dielectric constants. The metal layers 5 and 6 use a conductive material having a predetermined conductivity.

In this embodiment, the metal layers are formed by combining vertical strips and horizontal stripes. The first metal layer 5 is arranged as a combination of horizontal stripes. The second metal layer 6 is arranged as a combination of vertical stripes. The protective layer 1, intermediate layer 2, and adhesive layer 4 are arranged in an elliptical shape larger than the image of the metal layers. The vertical and horizontal stripes made of the metal layers are conductive. Portions between the vertical stripes or horizontal stripes are dielectric because of the absence of the metal layers.

The length of the long side of the second metal layer 6 must be $\frac{1}{2}^{n}$ of a predetermined wavelength. To cause resonance, the second metal layer 6 preferably has an anisotropic shape. The second metal layer 6 is rectangular here. However, the second metal layer 6 need not always have a rectangular shape and may have an elliptical shape or the like.

FIG. 5(*c*) shows detected voltages upon reading, using a sensor, the information recording patch E pasted to, e.g., an article of value via the adhesive layer. The detected voltage in the dielectric region corresponding to the portion of the protective layer 1, intermediate layer 2, and adhesive layer 4 arranged in an elliptical shape larger than the metal layers has a level lower than 0 V of the base. The detected voltage in the conductive region of the first metal layer 5 formed from horizontal stripes has a level higher than 0 V of the base. The detected voltage of the second metal layer 6 formed from vertical stripes has a level higher than that of the first metal layer 5 at each layer portion corresponding to a vertical stripe and a level lower than 0 V of the base at each dielectric region portion between the stripes.

Hence, in confirming the authenticity of the information recording patch, the information recording patch can be discriminated as authentic only when three conditions are satisfied upon reading using the sensor: the elliptical dielectric region is detected, the conductive regions having vertical and horizontal stripe patterns are detected at predetermined positions in the ellipse, and dielectric regions are detected between the stripes at predetermined positions in the ellipse.

(Form of Information Recording Patch)

The six elements of the third and fifth embodiments, i.e., the metal layer, the metal layer having a width and length that cause resonance with a frequency upon measuring using a microwave sensor, the protective layer, the intermediate layer, the adhesive layer, and the nonconductive region formed by partially removing the conductive region are measured using a microwave sensor. Then, the six elements are classified into the following three levels (a) to (c).

a) Dielectric level (low level): protective layer, intermediate layer, adhesive layer, and nonconductive region formed by partially removing the conductive region b) First conductive level (medium level): metal layer (conductive region)

c) Second conductive level (high level): metal layer (the portion that resonates with a predetermined wavelength upon measuring using a microwave sensor)

The information recording patch according to each of the third and fifth embodiments carries information by appropriately arranging the six elements and the three levels (a) to (c) in a combination of (a) and (b), (a) and (c), or (a), (b), and (c).

To apply the information recording patch to a base material or the like, for example, the following three methods are available.

(a) Direct Applying Method

The protective layer, intermediate layer, adhesive layer, and metal layer are directly applied to a base material. The protective layer, intermediate layer, and adhesive layer can be formed by forming a coating directly on a base material using an applicator, coater, or various kinds of printing machines. For stable mechanical reading, a method such as screen printing, gravure printing, or intaglio printing capable of obtaining a large ink transfer amount is preferable. The metal layer can be formed directly on the base material using a vapor deposition apparatus.

(b) Retransfer Method

A retransfer method used for an OVD or the like is available, in which the materials are arranged on a transfer base material and retransferred to a base material by, e.g., heat, pressure, or adhesive. For stable mechanical reading, it is preferable to form a uniform transfer film by thermal transfer printing or hot stamping.

(c) Label Method

A label that is an adhesive sticker is pasted to a printed product or the like together with the base material. To do this, a method is available, in which the materials are arranged on a label base material and pasted to a base material by, e.g., an applied adhesive. For stable mechanical reading, it is preferable to form a uniform transfer film by thermal transfer printing or hot stamping.

The thickness of the conductive layer is preferably 400 to 2,000 Å. If the conductive layer is thinner than 400 Å, it is difficult to obtain a sufficient voltage in detection by mechanical reading. If the conductive layer is thicker than 2,000 Å, the flexibility of the hologram becomes slightly poor.

(Mechanical Reading Method)

Mechanical reading necessary for authenticity discrimination of the information recording patch obtained by each of the first to fifth embodiments will be described next.

(Explanation of Principles)

To read the information recording patch of each of the first to fifth embodiments, it is necessary to use a mechanical reading apparatus capable of detecting the conductivity and dielectric constant. In this embodiment, mechanical reading using a sensor using a microwave that is a band of an electromagnetic wave will be described with reference to the accompanying drawings. In this embodiment, the electromagnetic wave has a frequency of 3 kHz (exclusive) to 30 THz (inclusive) as defined in the Radio Wave Act. For example, a microwave having a frequency of 1 GHz to 300 GHz is preferable.

Figure 6:
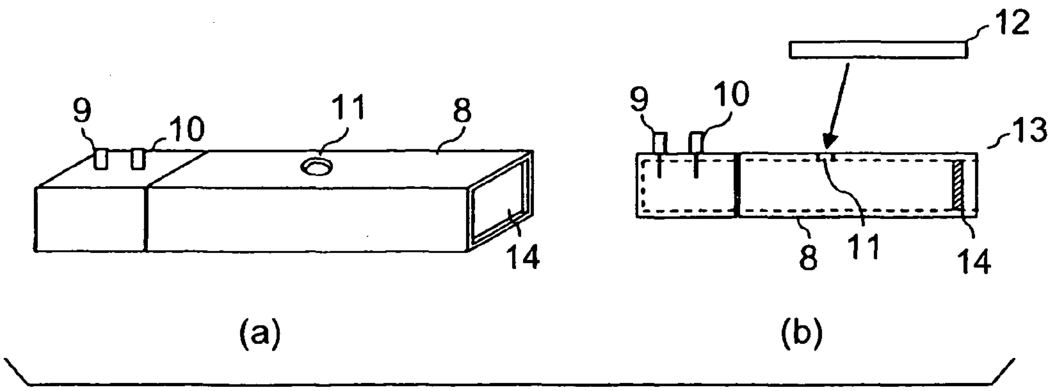
FIG. 6 shows explanatory views of the arrangement of a sensor capable of simultaneously measuring a conductor and a dielectric used in the first to fifth embodiments of the present invention.

FIG. 6(*a*) shows an example of the arrangement of a sensor capable of simultaneously measuring a conductor and a dielectric.

This sensor performs measurement by leaking a microwave from a waveguide 8 and will therefore be called a leakage microwave sensor 13. The leakage microwave sensor 13 includes the waveguide 8, an irradiation means 9 for irradiating the inside of the waveguide with an electromagnetic wave, a receiving means 10, a leakage hole 11 formed in a wall of the waveguide 8 to externally leak an electromagnetic wave propagating through the waveguide, and a reflecting plate 14.

FIG. 6(*b*) shows an example of the internal structure of the leakage microwave sensor 13 which performs measurement by leaking a microwave from the waveguide 8. The leakage microwave sensor 13 can detect the conductivity or dielectric property of a sheet-shaped target measurement object 12.

The principles of the leakage microwave sensor 13 will be described next.

Figure 7:
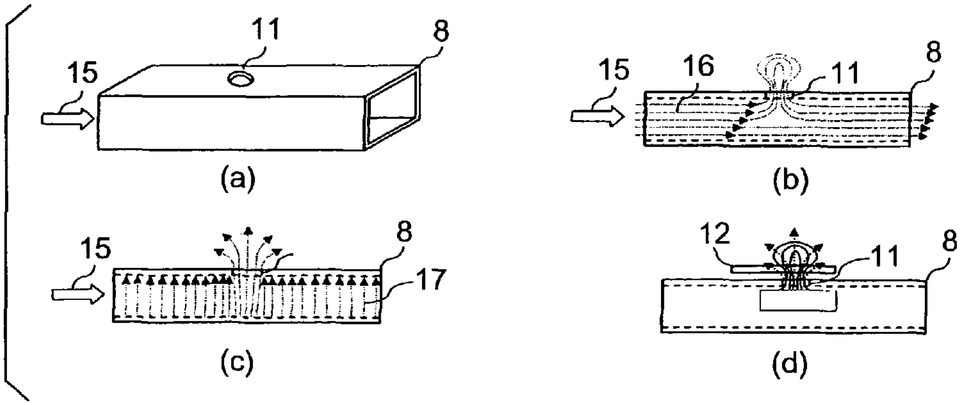
FIG. 7 shows explanatory views of the main part of a leakage microwave sensor used in the first to fifth embodiments of the present invention.

FIG. 7 shows the main part of the leakage microwave sensor 13. This part corresponds to the core of the function. FIG. 7(*a*) shows a state in which the leakage hole 11 for leaking an electromagnetic wave 15 is arranged in the upper wall of the waveguide 8, and the electromagnetic wave 15 from the electromagnetic wave oscillation source irradiates the inside of the waveguide 8 so that an electromagnetic wave distribution in a TE10 mode is obtained in the waveguide.

FIG. 7(*b*) shows a magnetic field distribution 16 of a magnetic field in the waveguide and a magnetic field leaked from the leakage hole 11. FIG. 7(*c*) shows an electric field distribution 17 of an electric field in the waveguide and an electric field leaked from the leakage hole 11. FIG. 7(*d*) shows a principle that when a leaked electromagnetic field is transmitted through the target measurement object 12 which is placed on the leakage hole 11 while facing it, the magnetic field distribution 16 or electric field distribution 17 in the waveguide changes depending on the material properties of the target measurement object 12.

In this case, when a portion such as a paper or resin portion having a large dielectric constant comes to the leakage hole 11, it affects the leaked electromagnetic field. Hence, the amplitude or phase of a standing wave generated upon synthesizing the electromagnetic wave propagating through the waveguide 8 and the reflected electromagnetic wave changes. When a portion such as a metal deposition film or crystal film having a high conductivity comes to the leakage hole 11, the material with the high conductivity blocks the leakage hole. Hence, a cavity resonance state is generated in the waveguide 8, and the amplitude or phase of the electromagnetic field changes.

More specifically, the detected voltage obtained by measurement exhibits a waveform including both the change by the dielectric constant and the change by the conductivity. For this reason, whether the target measurement material is a conductor or a dielectric can be known based on the waveform in measurement.

Principles that the target measurement object 12 is placed on the apparatus and measured will be described next.

Figure 8:
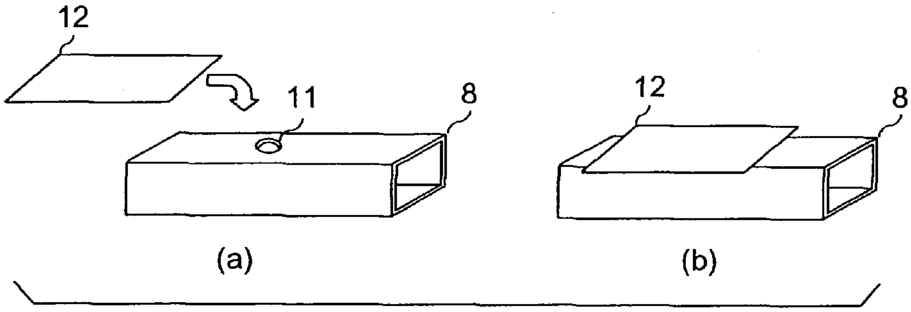
FIG. 8 shows explanatory views of a state in which a target measurement object is placed on the sensor and measured in the first to fifth embodiments of the present invention.

FIG. 8 shows a state in which the target measurement object is placed on the apparatus and measured. FIG. 8(*a*) shows a state in which the target measurement object 12 is not present on the leakage hole 11. The detected voltage at this time is defined as a first voltage (this level is considered as the zero-base of the detected voltage).

FIG. 8(*b*) shows a state in which the target measurement object 12 is placed on the leakage hole 11. The detected voltage at this time is defined as a second voltage.

Figure 9:
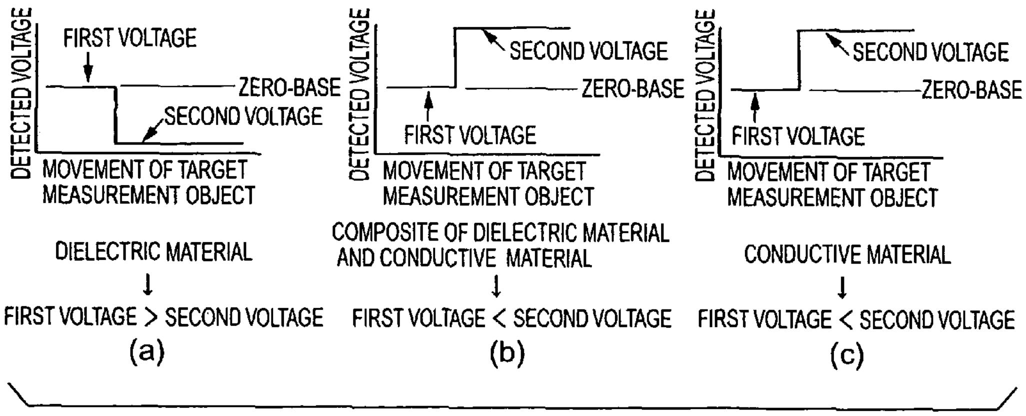
FIG. 9 shows graphs showing the classification of detected voltages obtained using the sensor.

FIGS. 9(*a*), 9(*b*), and 9(*c*) show the three classes of detected voltages obtained upon measuring various kinds of target measurement objects 12 in the order of FIGS. 8(*a*) and 8(*b*).

FIG. 9(*a*) shows a voltage when the target measurement object 12 is made of a PET film. The second voltage exhibited a negative value based on the dielectric constant.

That is, when the target measurement object 12 is made of a dielectric material, first voltage>second voltage.

FIG. 9(*b*) shows a voltage when the target measurement object 12 is made of a metal layer formed by metal deposition on a PET film. The target measurement object 12 was placed on the leakage hole 11 and measured without being relatively moved. Hence, the second voltage exhibited not a negative value based on the dielectric constant of PET but only a positive value based on the metal layer having a high conductivity.

That is, when the target measurement object 12 made of a composite material of a dielectric material and a conductive material is measured without conveyance, first voltage<second voltage.

FIG. 9(*c*) shows a voltage when the target measurement object 12 is made of an aluminum foil (a general aluminum foil for domestic use). The second voltage exhibited a positive value based on the conductivity.

That is, when the target measurement object 12 is made of a conductive material, first voltage<second voltage.

The components of the leakage microwave sensor will be described next.

Figure 10:
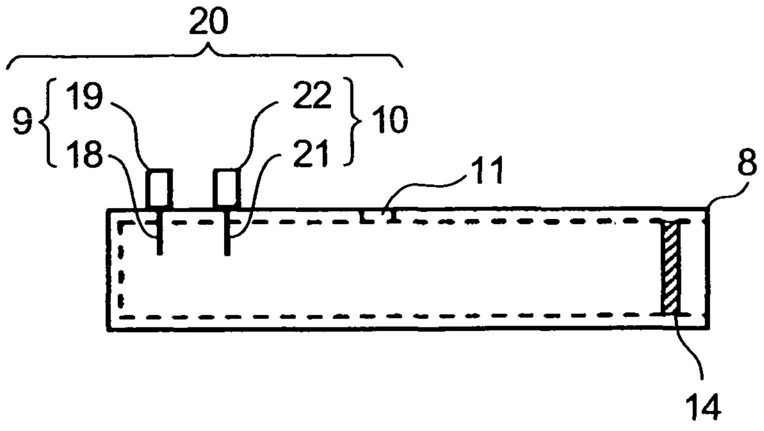
FIG. 10 is a sectional view showing the sectional structure of the microwave sensor used in the first to fifth embodiments of the present invention.

As shown in FIG. 10, the sensor comprises the irradiation means 9 including a transmitting antenna 18 and a transmitting diode 19 such as a Gunn diode, the receiving means 10 including a receiving antenna 21 and a receiving diode 22 such as a Schottky diode, the waveguide 8 having the leakage hole 11 in the upper wall, and the reflecting plate 14 to close the waveguide 8.

The transmitting diode 19 irradiates the inside of the waveguide with an electromagnetic wave in a TE10 mode via the transmitting antenna 18. The electromagnetic field partially externally leaks from the leakage hole 11. When the target measurement object 12 is placed on the leakage hole 11, the electromagnetic field is transmitted through the target measurement object 12. The amplitude or phase of the electromagnetic wave in the waveguide changes depending on the material properties of the target measurement object. The receiving diode 22 detects the change via the receiving antenna 21 to discriminate the material of the target measurement object on the basis of the change amount.

As for adjustment of the apparatus, the positions of the leakage hole 11 and reflecting plate 14 relative to a microwave transmitting/receiving unit 20 are important to most leak the electromagnetic wave 15 in the waveguide from the leakage hole 11. To enable measurement based on the conductivity, the leakage hole and reflecting plate are preferably adjusted to such positions that generate a cavity resonance state in the waveguide when the conductor blocks the leakage hole 11.

In the example to be describe below, a Doppler module used in an automatic door or speed sensor is used as a component that serves as both the irradiation means 9 including the transmitting antenna 18 and the transmitting diode 19 such as a Gunn diode and the receiving means 10 including the receiving antenna 21 and the receiving diode 22 such as a Schottky diode. The Doppler module comprises the transmitting diode 19, transmitting antenna 18, receiving diode 22, and receiving antenna 21 in a square waveguide WR42 and can transmit or receive an electromagnetic wave of 24.15 GHz in the TE10 mode.

The leakage microwave sensor 13 is used here as the mechanical reading sensor. However, any other sensor capable of reading a conductor or a dielectric is usable.

Simultaneously with the voltage waveform measurement using the leakage microwave sensor 13, a voltage waveform may be measured using an optical sensor, capacitance sensor, or eddy current sensor for the target measurement object 12. In this case, the voltage waveform obtained from the leakage microwave sensor 13 on the basis of the conductivity and dielectric constant is compared with the voltage waveform with or without an OVD obtained from the optical sensor, capacitance sensor, or eddy current sensor. Authenticity discrimination is done based on the difference between the waveforms.

Simultaneously with the voltage waveform measurement using the leakage microwave sensor 13, the target measurement object 12 may be irradiated with near infrared light, and the waveform of the transmitted near infrared light may be measured. The shielding characteristic of a radio wave obtained from the leakage microwave sensor 13 is compared with the non-transmittance of the light obtained from the waveform of light. Authenticity discrimination is done based on the difference between the waveforms.

A method of reading, using the leakage microwave sensor 13, a conductor formed into a length that causes resonance with a frequency will be described next.

The conductor is formed into a desired length and/or a desired width using a material having a high electric conductivity and arranged to express information.

Figure 11:
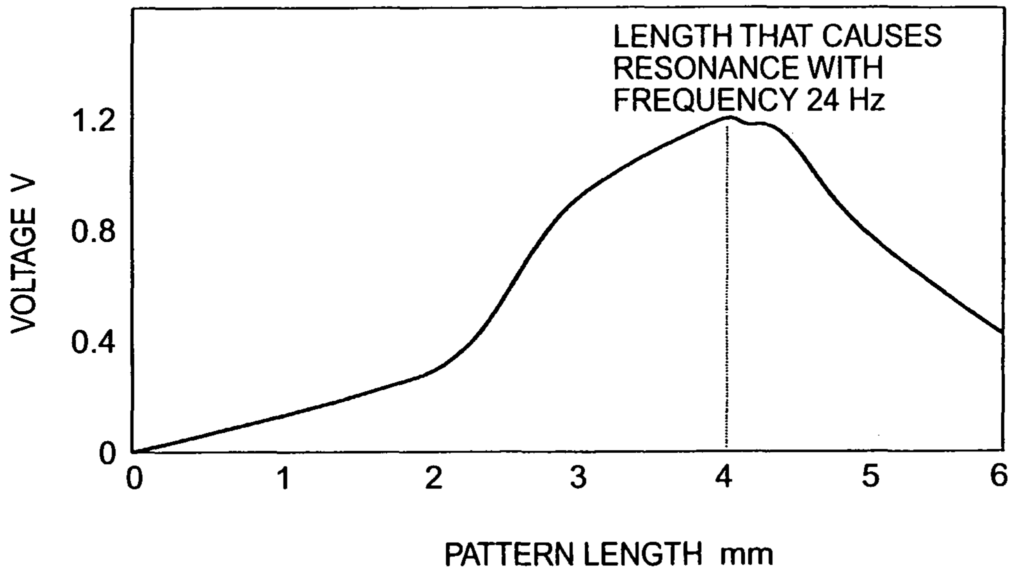
FIG. 11 is a graph showing the pattern length of a metal layer and a microwave detected voltage in the information recording patch according to the first to fifth embodiments of the present invention.

FIG. 11 is a graph showing the length of a metal layer which resonates with a frequency plotted along the abscissa and a microwave detected voltage plotted along the ordinate. The microwave is an electromagnetic wave. Its frequency (GHz) and waveform (mm) are given below.

wavelength $\lambda=c/f$ (c: velocity of light, f: frequency)

The resonant wavelength of the antenna for the electromagnetic wave is a fraction of an integer of the wavelength λ. The value of the microwave detected voltage is affected by various factors as described above. Microwave detected voltages of smooth conductors having various lengths were actually measured using a microwave transmitter/receiver of 24.15 GHz.

According to the experiments, the highest microwave detected voltage can be obtained from an about 4-mm long conductor based on various factors, as shown in FIG. 11. Because of the presence of various factors, in Examples 1 and 2, the length of the smooth conductor was set to "almost" a fraction of an integer of the electromagnetic wave wavelength. According to the experiments, generally, the detected voltage of a smooth conductor whose length was about ¼ the wavelength of the detection microwave was high. The maximum value of the microwave detected voltage was observed at lengths corresponding to $1/2^n$ (n is an integer: n≥0), i.e., ½, ⅛, 1/16, . . . .

Results obtained by measuring the information recording patches shown in FIGS. 1 to 5 described above using the leakage microwave sensor 13 will be described next.

FIG. 1(*c*) shows the measurement result of the information recording patch A in FIGS. 1(*a*) and 1(*b*). The detected voltage by the leakage microwave sensor 13 exhibited "medium level" in the circular conductive region arranged in the metal layer 3, and "low level" in the remaining portion formed by the protective layer 1, intermediate layer 2, and adhesive layer 4.

FIG. 2(*c*) shows the measurement result of the information recording patch B in FIGS. 2(*a*) and 2(*b*). The detected voltage by the leakage microwave sensor 13 exhibited "medium level" in the two kinds of conductive regions, i.e., the circular and crescent conductive regions are arranged in the metal layers 5 and 6, and "low level" in the remaining portion formed by the protective layer 1, intermediate layer 2, and adhesive layer 4.

FIG. 3(*c*) shows the measurement result of the information recording patch C in FIGS. 3(*a*) and 3(*b*). The two kinds of conductive regions are arranged in the metal layers 5 and 6. The detected voltage by the leakage microwave sensor 13 exhibited "medium level" in the circular conductive region, "high level" in the conductive regions that resonate with a frequency, and "low level" in the remaining portion formed by the protective layer 1, intermediate layer 2, and adhesive layer 4.

FIG. 4(*c*) shows the measurement result of the information recording patch D in FIGS. 4(*a*) and 4(*b*). The detected voltage by the leakage microwave sensor 13 exhibited "medium level" in the circular conductive region arranged in the metal layer 3, "low level" in the nonconductive regions 7 formed in the circular metal layer 3, and "low level" in the remaining portion formed by the protective layer 1, intermediate layer 2, and adhesive layer 4.

FIG. 5(*c*) shows the measurement result of the information recording patch E in FIGS. 5(*a*) and 5(*b*). The metal layers 5 and 6 form combinations of vertical and horizontal stripes. The detected voltage by the leakage microwave sensor 13 exhibited "high level" in each vertical stripe portion of the second metal layer 6, "medium level" in each horizontal stripe portion of the first metal layer 5, "low level" in portions between the vertical and horizontal stripes, and "low level" in the remaining portions formed by the protective layer 1, intermediate layer 2, and adhesive layer 4. Although the second metal layer 6 and the first metal layer 5 have the same stripe pattern, the detected voltage of the second metal layer 6 is higher because the length of each vertical stripe resonates with the frequency of the leakage microwave sensor 13 used for the measurement, and the sensor and the vertical stripes are parallel to each other.

Example 1

Figure 12:
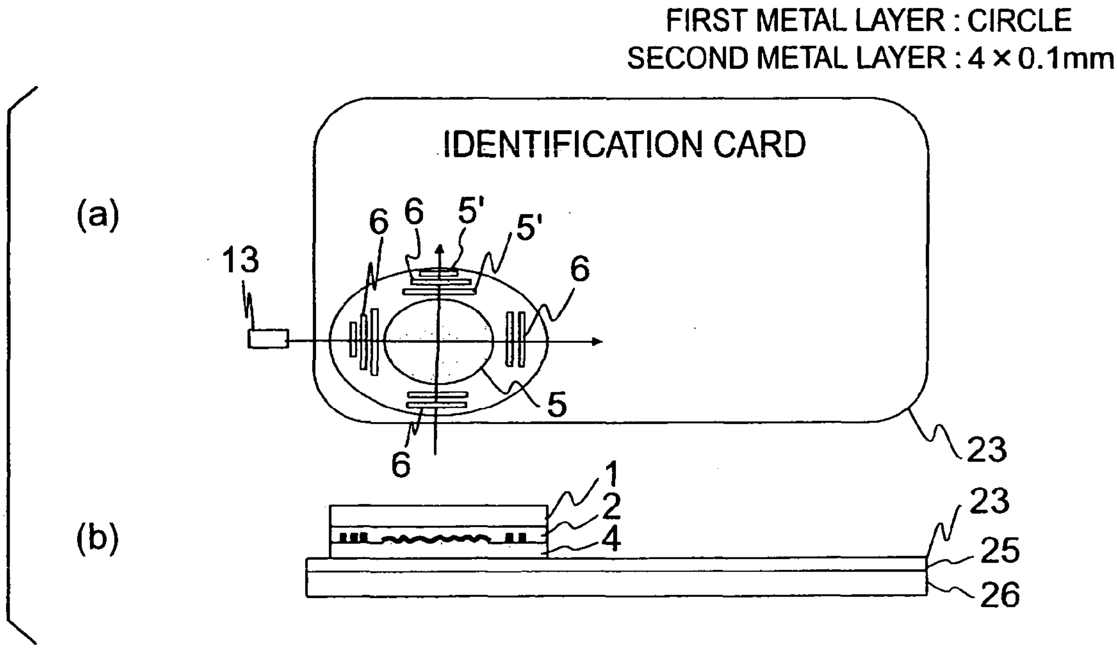
FIG. 12 shows views of an identification card according to Example 1 of the first to fifth embodiments.
Figure 13:
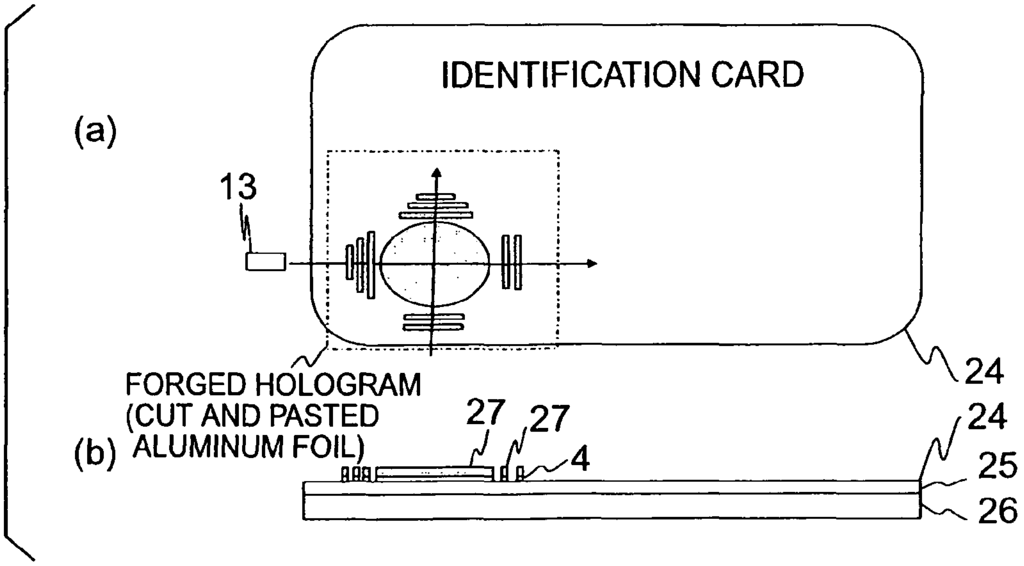
FIG. 13 shows views of a forged product of the identification card.
Figure 14:
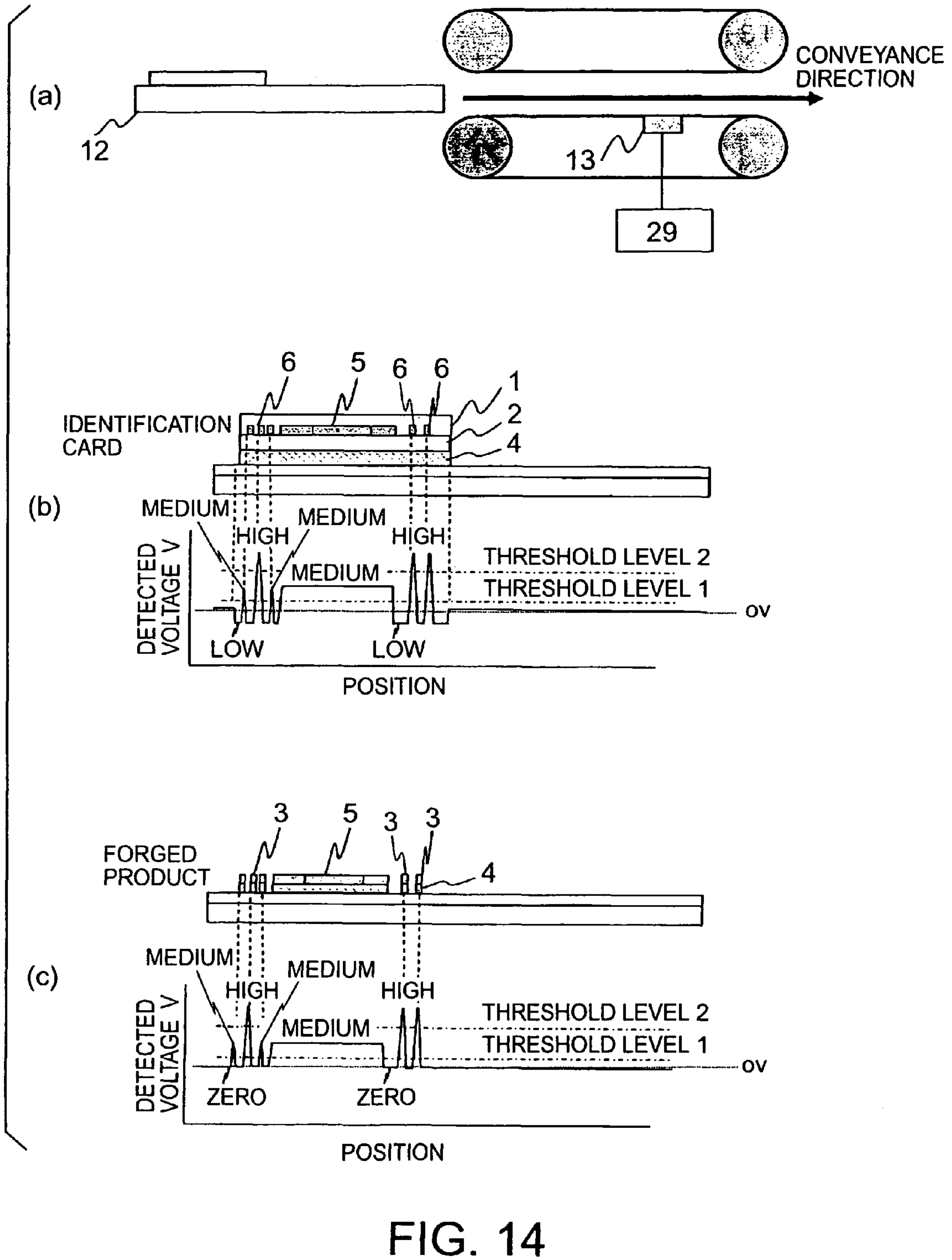
FIG. 14 shows explanatory views of an example of the arrangement of a discrimination apparatus and graphs showing detected voltages in discriminating an authentic identification card and a forged product.

FIG. 12 to 14 show an example of an identification card with an information recording patch as Example 1 of the first to fifth embodiments. FIG. 12 shows an authentic identification card 23. FIG. 13 shows a forged product 24 of the identification card. FIG. 14 shows detected voltages in mechanical reading.

FIG. 12(*a*) is a plan view showing an example of the authentic product of the identification card. FIG. 12(*b*) shows its section.

Printing is performed on a base material 26 to form an ink layer 25. An elliptical information recording patch according to the embodiment, which allows authenticity discrimination, is pasted onto the ink layer 25.

The information recording patch includes the adhesive layer 4, intermediate layer 2, first metal layers 5 and 5', second metal layers 6, and protective layer 1.

The ink layer 25, base material 26, adhesive layer 4, and protective layer 1 made of a polyethylene resin are dielectric. The first metal layers 5 and 5' formed by aluminum vapor deposition are conductive. The second metal layers 6 formed by aluminum vapor deposition are conductive but have a size to resonate with the frequency (24.15 GHz) of the leakage microwave sensor 13 used for measurement, unlike the first metal layers 5 and 5'. The first metal layers 5' each having a length and width different from those of the second metal layers 6 that resonate with the sensor are appropriately arranged.

FIG. 12(*b*) shows the section of the authentic product. The identification card 23 basically has the following four kinds of layer structures as a whole.

(1) Base material, ink layer, protective layer, intermediate layer, and adhesive layer (2) Base material, ink layer, protective layer, intermediate layer, adhesive layer, and first metal layer (3) Base material, ink layer, protective layer, intermediate layer, adhesive layer, and second metal layer (4) Only base material and ink layer When the identification card 23 having these four kinds of layer structures is measured through each layer stack using a leakage microwave sensor, the following detection levels are obtained.

(1) Only dielectric layers→low level (2) Dielectric layers and first metal layer→medium level (3) Dielectric layers and second metal layer→high level (4) Only dielectric layers→low level The contents of the respective layers of the identification card 23 will be explained next.

A 0.3-mm thick PET film was used as the base material 26. Any other material having a desired conductivity or dielectric constant is usable except for PET. The thickness is preferably about 0.3 to 0.75 mm.

The ink layer 25 is formed to print a design on the card. An ink having a desired conductivity or dielectric constant is usable. Printing was performed to an ink thickness of about 1 μm by offset printing.

When the ink layer 25 was actually measured by the leakage microwave sensor 13, the detected voltage level was much lower than that of the information recording patch portion. Such a level is supposed to be negligible and have no effect in Example 1.

In Example 1, the intermediate layer 2 was formed using a 0.1-mm thick PET layer. A three-dimensional pattern for an optical change in a hologram forming layer was formed.

For the adhesive layer 4 and the protective layer 1, a material having a desired conductivity or dielectric constant can be selected from existing materials.

The first metal layers 5 and 5' and the second metal layers 6 were formed by depositing a metal on the intermediate layer 2. The first metal layers 5 and 5' were designed to exhibit "medium level", and the second metal layers 6 were designed to exhibit "high level" upon measurement using the leakage microwave sensor 13.

In Example 1, the first metal layers 5 and 5' and the second metal layers 6 were formed by aluminum vapor deposition to a film thickness of 500 Å. However, any other material such as chromium is also usable if a desired conductivity can be obtained.

Each second metal layer 6 needs to have a size to obtain a high level upon resonating with the frequency (24.15 GHz) of the leakage microwave sensor 13 used for measurement. In Example 1, each second metal layer 6 had a bar-like shape having a 4-mm long side and a 0.1-mm short side.

The short side of the second metal layer 6 was set to 0.1 mm against a forgery method of cutting and pasting an available aluminum foil. The width is preferably as small as possible and is not limited to 0.1 mm.

FIG. 13(*a*) shows an example of the forged product 24 of the identification card. FIG. 13(*b*) shows the section of the forged product. The forged product 24 of the identification card is formed by copying the authentic product shown in FIG. 12 by a copying machine and pasting an available aluminum foil 27 or the like.

As shown in the sectional view, a large difference from the authentic product is that the intermediate layer 2 and protective layer 1 of the information recording patch used in Example 1 do not exist.

FIG. 14(*a*) shows an example of a discrimination apparatus for discriminating the target measurement object 12. This apparatus comprises the leakage microwave sensor 13, oscilloscope 29, and conveyor 28.

This discrimination apparatus causes the conveyor 28 to convey target measurement objects, i.e., the authentic identification card 23 shown in FIG. 12(*a*) and the forged product 24 shown in FIG. 13(*a*) and causes the leakage microwave sensor 13 to read them.

The conveyor 28 conveys the identification card 23 sandwiched between conveyor belts arranged on the upper and lower sides at a conveyance speed of 2 m/sec to the leakage microwave sensor 13. The leakage microwave sensor 13 is arranged at a position to measure the information recording patch pasted portion of the moving identification card 23 that is being conveyed. The oscilloscope 29 can display the waveform of a detected voltage scanned and measured by the leakage microwave sensor 13. The forged product 24 of the identification card is also measured in the same way.

In Example 1, measurement is done using the leakage microwave sensor 13. However, any other measurement apparatus capable of discriminatingly reading the nonconductive region, first metal layer 5, and second metal layer 6 is usable.

FIG. 14(*b*) shows a detected voltage waveform obtained by measuring the authentic identification card 23.

As can be seen from the waveform, three kinds of detection levels were obtained in the respective portions, including "low level" in the region having only the dielectrics, "medium level" in the region of the dielectrics and the first metal layer 5 or 5', and "high level" in the region of the dielectrics and the second metal layer 6. The identification card can be regarded as authentic based on FIG. 12(*b*) described above.

On the other hand, FIG. 14(*c*) shows a detected voltage waveform obtained by measuring the forged product 24. As can be seen from the waveform, two kinds of detection levels were obtained in the respective portions, including "medium level" in the region of the dielectrics and the first metal layer 5, and "high level" in the region of the dielectrics and the second metal layer 6. However, since the detected voltage level in the region having only the dielectrics was not low but zero, the identification card can be regarded as a forged product. In this way, it is possible to discriminate the authenticity based on the layer structure of the hologram.

Example 2

Figure 15:
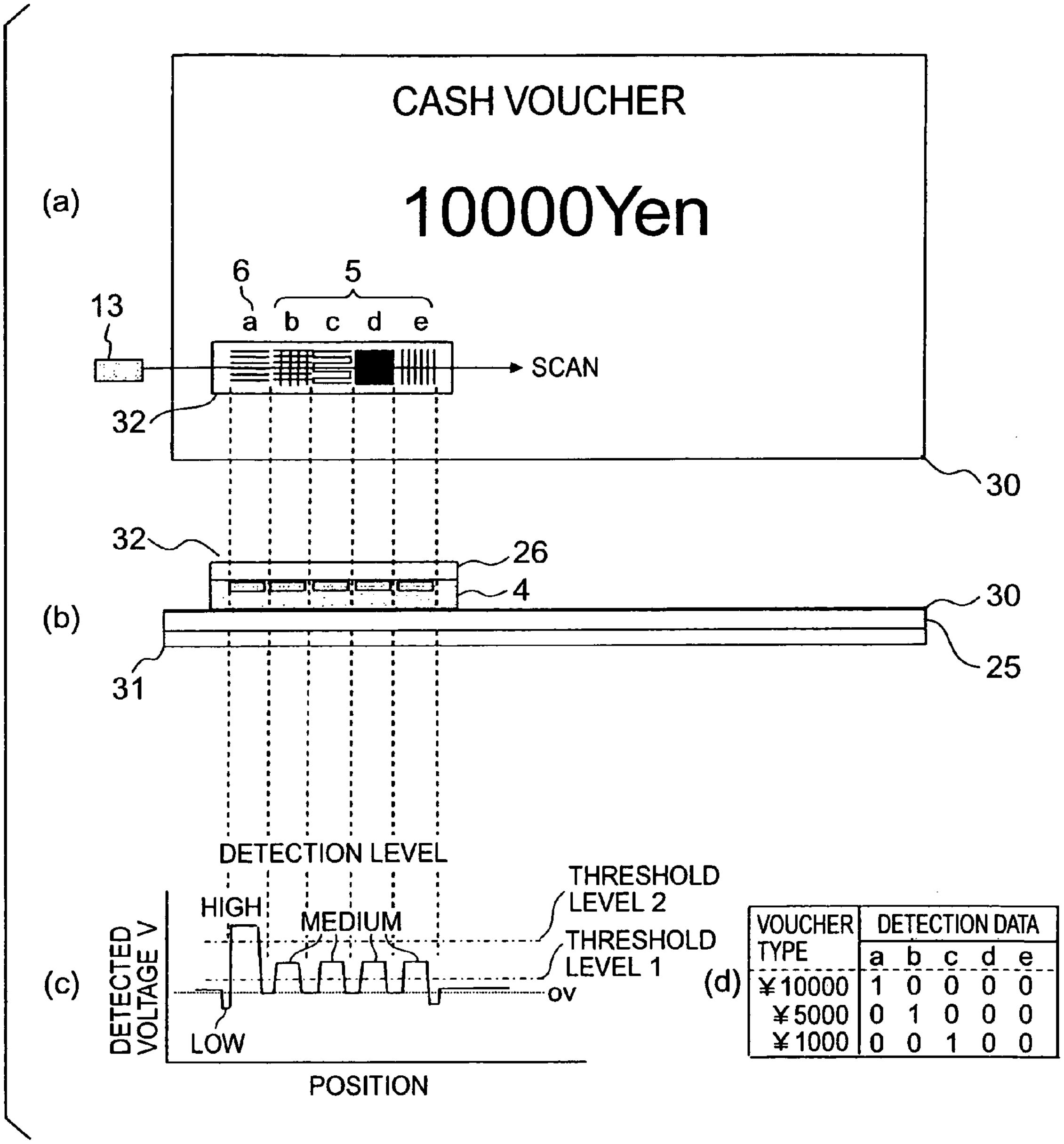
FIG. 15 shows views of a cash voucher according to Example 2 of the first to fifth embodiments.

FIG. 15 shows Example 2 in which an information recording patch is applied to a cash voucher. In Example 1, two detection levels are obtained by causing the first metal layer 5 and second metal layer 6 of the information recording patch to have different lengths. In Example 2, a high-level detected voltage is obtained by changing the length of the second metal layer 6 and additionally by making the direction of the leakage microwave sensor 13 relatively parallel to a pattern formed by arranging a conductive material in stripes.

A cash voucher 30 shown in FIG. 15(*a*) is formed by printing its face value on a base material to form the ink layer 25, and pasting, onto the ink layer, a discrimination label 32 that is a metal foil having a rectangular shape and capable of recording information. The metal foil includes the adhesive layer 4, first metal layer 5, second metal layer 6, and base material layer 26. The ink layer 25, paper sheet 31, adhesive layer 4, and base material layer 26 are dielectric. The first metal layer 5 formed by aluminum vapor deposition is conductive. The second metal layer 6 formed by aluminum vapor deposition is conductive but has a design to resonate with the frequency (24.15 GHz) of the leakage microwave sensor 13 used for measurement, unlike the first metal layer 5.

FIG. 15(*b*) shows a section which basically has the following four kinds of layer structures.

(1) Paper sheet, ink layer, base material layer, and adhesive layer (2) Paper sheet, ink layer, base material layer, adhesive layer, first metal layer (3) Paper sheet, ink layer, base material layer, adhesive layer, second metal layer (4) Only paper sheet and ink layer When these four kinds of layer structures are measured through each layer stack using a leakage microwave sensor, the following detection levels are obtained.

(1) Only dielectric layers→low level (2) Dielectric layers and first metal layer→medium level (3) Dielectric layers and second metal layer→high level (4) Only dielectric layers→low level The contents of the respective layers of the cash voucher will be explained next.

A 0.1-mm thick bond paper sheet was used as the paper sheet 31. Any other material having a desired conductivity or dielectric constant is usable except for the bond paper sheet.

The ink layer 25 is formed by printing necessary information such as a face value on the paper sheet 31. An ink having a desired conductivity or dielectric constant is usable. In Example 2, printing was performed to an ink thickness of about 1 μm by offset printing. When the printed portion was actually measured by the leakage microwave sensor 13, the detected voltage level was much lower than that of the portion of the discrimination label 32. Such a level is supposed to be negligible and have no effect in Example 2.

In Example 2, the base material layer was formed using a 0.1-mm thick PET film.

For the adhesive layer 4, a material having a desired conductivity or dielectric constant can be selected from existing materials.

The first metal layer 5 and the second metal layer 6 were formed by aluminum vapor deposition on the base material layer 26. The first metal layer 5 is designed to exhibit "medium level", and the second metal layer 6 was designed to exhibit "high level" upon measurement using the leakage microwave sensor 13. In Example 2, the first metal layer 5 and the second metal layer 6 were formed by aluminum vapor deposition to a film thickness of 500 Å. However, any other material such as chromium is also usable if a desired conductivity can be obtained.

FIG. 15(*a*) shows examples of designs applicable to the first metal layer 5 and the second metal layer 6. The second metal layer 6 has a design that resonates with the frequency (24.15 GHz) of the leakage microwave sensor 13 used for measurement to obtain a high level. An example is indicated by a portion a in FIG. 15(*a*). The portion a in FIG. 15(*a*) is formed by arranging 20 bars of a conductive material, each having a length of 4 mm and a width of 0.1 mm, in a stripe pattern at an interval of 0.1 mm. When the portion a relatively parallel to the leakage microwave sensor is read, a high-level detected voltage is obtained.

The first metal layer 5 has a design that does not resonate with the frequency (24.15 GHz) of the leakage microwave sensor 13 used for measurement to obtain a medium level. Examples of the first metal layer 5 are indicated by portions b, c, d, and e in FIG. 15(*a*).

The portion b in FIG. 15(*a*) will be described in detail. The portion b is formed by arranging 20 bars each having a length of 4 mm and a width of 0.1 mm in a stripe pattern at an interval of 0.1 mm and also superimposing a stripe pattern perpendicularly intersecting the 20 stripes so that no resonance with the frequency occurs. When the portion b is read by the leakage microwave sensor, no resonance occurs, and a medium-level detected voltage is obtained. That is, the portion b in FIG. 15(*a*) apparently resembles the portion a. However, the portion b does not resonate with the frequency, and only a medium level is obtained. The medium level is easier to obtain as the number of bars that are made of a conductive material and arranged relatively perpendicular to the sensor increases. This is because the pattern becomes almost solid, as indicated by d.

The portions c, d, and e shown in FIG. 15(*a*) also apparently resemble the portion a. However, they do not resonate with the frequency, and only a medium level is obtained because the portion c has a zigzag design, the portion d is solid, and the portion e includes bars that are made of a conductive material and arranged in a stripe pattern relatively perpendicular to the sensor.

FIG. 15(*c*) shows a result obtained by causing the conveyor 28 to convey the cash voucher 30 and causing the leakage microwave sensor 13 to read it. In reading, the apparatus shown in FIG. 14(*a*) was used.

When scanning measurement was done, a waveform shown in FIG. 15(*c*) was obtained. The waveform was compared with threshold level 1 and threshold level 2 to classify the respective portions of the discrimination label 32 into three, high, medium, and low levels. The portion a corresponding to the second metal layer 6 in FIG. 15(*a*) exhibited "high level", the portions b, c, d, and e corresponding to the first metal layer 5 exhibited "medium level", and the portion including only the base material layer 26 and the adhesive layer 4 without the metal layers 5 and 6 exhibited "low level". The levels are "high, medium, medium, medium, medium" in the scanning direction. They are replaced with "1" and "0" to obtain "10000". This will be referred to as detection data.

When the detection data was collated with a preset relationship between detection data and voucher types (table in FIG. 15(*d*)), the face value of the cash voucher was discriminated as ¥10,000.

The information recording patch of Example 2 is created aiming at mechanically reading the face value of the cash voucher and also as a measure against a forgery method of cutting and pasting, e.g., an available aluminum foil. Hence, the cut width is not limited to 0.1 mm in Example 2 and is preferably smaller.

A basic authenticity discrimination method for various articles of value with information recording patches will be explained next.

Example 3

Figure 16:
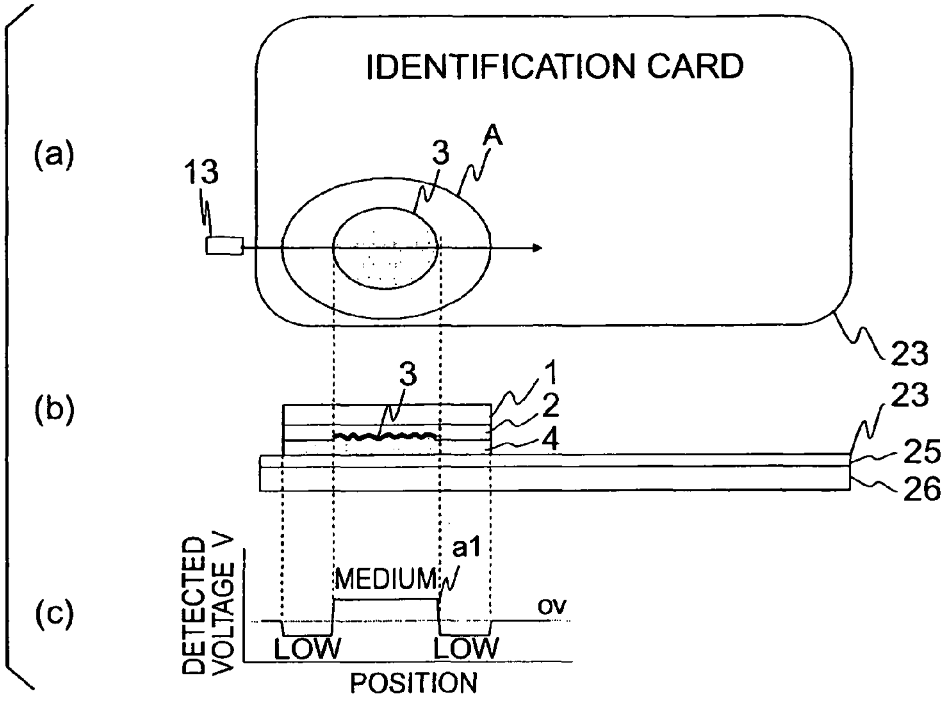
FIG. 16 shows views of examples of an identification card and a detected voltage according to Example 3 of the first to fifth embodiments.
Figure 17:
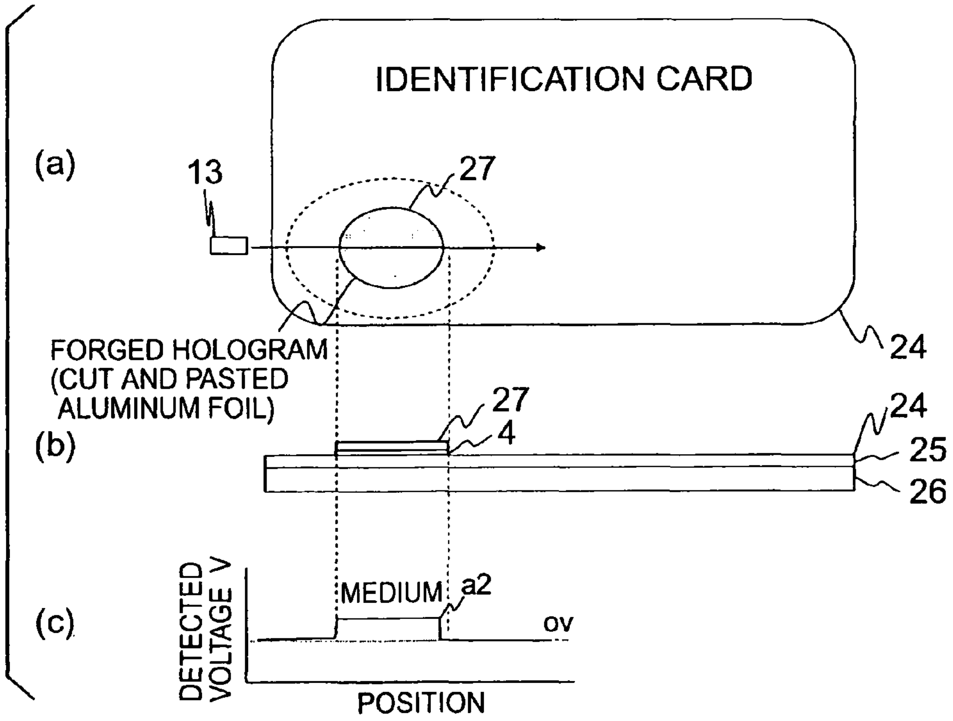
FIG. 17 shows views of an example of a forged product according to Example 3.

FIGS. 16 and 17 show, as Example 3, examples of an identification card with the information recording patch described in the first embodiment. FIG. 16 shows the authentic identification card 23. FIG. 17 shows the forged product 24 of the membership card.

FIG. 16(*a*) is a plan view showing an example of the authentic product of the identification card. FIG. 16(*b*) shows its section. Printing is performed on the base material 26 to form the ink layer 25. The elliptical information recording patch A according to the embodiment, which allows authenticity discrimination, is pasted onto the ink layer 25.

The information recording patch includes the adhesive layer 4, intermediate layer 2, metal layer 3, and protective layer 1.

The ink layer 25, base material 26, adhesive layer 4, and protective layer 1 made of a polyethylene resin are dielectric. The metal layer 3 formed by aluminum vapor deposition is conductive.

FIG. 16(*b*) shows the section of the authentic product. The identification card 23 basically has the following three kinds of layer structures as a whole.

(1) Base material, ink layer, protective layer, intermediate layer, and adhesive layer (2) Base material, ink layer, protective layer, intermediate layer, adhesive layer, and metal layer (3) Only base material and ink layer When the identification card 23 having these three kinds of layer structures is measured through each layer stack using a leakage microwave sensor, the following detection levels are obtained.

(1) Only dielectric layers→low level (2) Dielectric layers and metal layer→medium level The contents of the respective layers of the identification card 23 will be explained next.

A 0.3-mm thick PET film was used as the base material 26. Any other material having a desired conductivity or dielectric constant is usable except for PET. The thickness is preferably about 0.3 to 0.75 mm. The ink layer 25 is formed to print a design on the card. An ink having a desired conductivity or dielectric constant is usable. Printing was performed to an ink thickness of about 1 μm by offset printing.

When the ink layer 25 was actually measured by the leakage microwave sensor 13, the detected voltage level was much lower than that of the information recording patch portion. Such a level is supposed to be negligible and have no effect in Example 3.

In Example 3, the intermediate layer 2 was formed using a 0.1-mm thick PET layer. A three-dimensional pattern for an optical change in a hologram forming layer was formed. For the adhesive layer 4 and the protective layer 1, a material having a desired conductivity or dielectric constant can be selected from existing materials. The metal layer 3 is formed by depositing a metal on the intermediate layer 2 and exhibits "medium level" upon measurement using the leakage microwave sensor 13.

In Example 3, the metal layer 3 was formed by aluminum vapor deposition to a film thickness of 500 Å. However, any other material such as chromium is also usable if a desired conductivity can be obtained.

FIG. 17(*a*) shows an example of the forged product 24 of the identification card. FIG. 17(*b*) shows the section of the forged product. The forged product 24 of the identification card is formed by copying the authentic product shown in FIG. 16 by a copying machine and pasting the available aluminum foil 27 or the like. As shown in the sectional view, a large difference from the authentic product is that the intermediate layer 2 and protective layer 1 of the information recording patch A used in Example 3 do not exist.

The discrimination apparatus shown in FIG. 14(*a*) causes the conveyor 28 to convey target measurement objects, i.e., the authentic identification card 23 shown in FIG. 16(*a*) and the forged product 24 shown in FIG. 17(*a*) and causes the leakage microwave sensor 13 to read them.

The conveyor 28 conveys the identification card sandwiched between conveyor belts arranged on the upper and lower sides at a conveyance speed of 2 m/sec to the leakage microwave sensor 13. The leakage microwave sensor 13 is arranged at a position to measure the information recording patch pasted portion of the moving identification card 23 that is being conveyed. The oscilloscope 29 can display the waveform of a detected voltage scanned and measured by the leakage microwave sensor 13. The forged product 24 of the identification card is also measured in the same way.

In Example 3, measurement is done using the leakage microwave sensor 13. However, any other measurement apparatus capable of discriminatingly reading the nonconductive region and the metal layer 3 is usable.

FIG. 16(*c*) shows a detected voltage waveform a1 obtained by measuring the authentic identification card 23. As can be seen from the waveform, two kinds of detection levels were obtained in the respective portions, including "low level" in the region having only the dielectrics, and "medium level" in the region of the dielectrics and the metal layer 3. Hence, the identification card can be regarded as authentic.

On the other hand, FIG. 17(*c*) shows a detected voltage waveform a2 obtained by measuring the forged product 24. As can be seen from the waveform, two kinds of detection levels were obtained in the respective portions, including "low level" in the region having only the dielectrics, and "medium level" in the region of the dielectrics and the metal layer 3. However, since the detected voltage level in the region having only the dielectrics was not low, as in FIG. 16(*c*), but zero, the identification card can be regarded as a forged product. That is, it is possible to discriminate the forged product 24 based on the absence of the protective layer 1, intermediate layer 2, and adhesive layer 4 around the aluminum layer 27 or the like.

As described above, according to the first to fifth embodiments of the present invention, it is possible to reliably discriminate a forged product formed by a metallization technique. Additionally, even when a mechanical authenticity discrimination apparatus having a conveyance system produces conveyance disturbance or noise, stable authenticity discrimination is possible.

Even when a hologram or the like is formed on the information recording patch, it is very difficult to forge it or alter the data by using all materials because conductive regions, dielectric regions, and metal adhered regions each having a width and length that cause resonance with the frequency of the microwave sensor are appropriately arranged.

Figure 18:
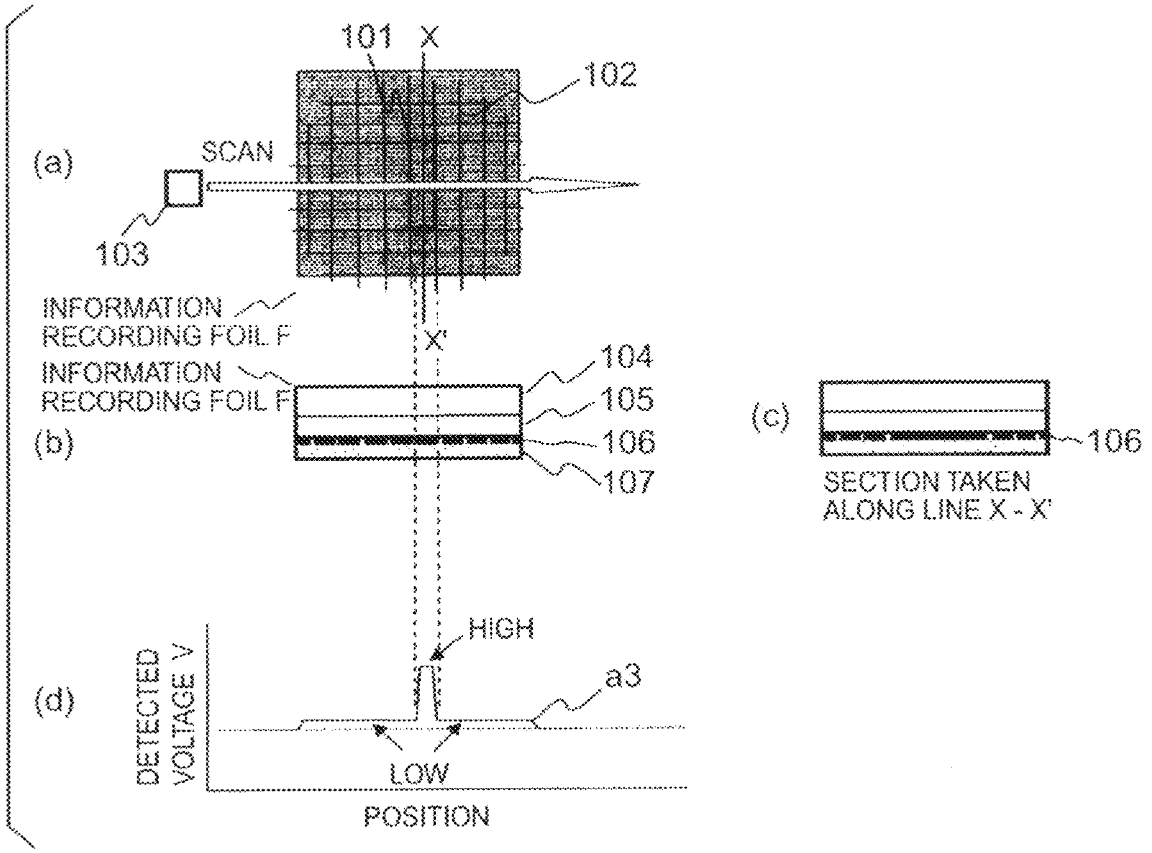
FIG. 18 shows explanatory views of the structure of an information recording patch and a detected voltage according to the sixth embodiment of the present invention.

FIG. 18 shows an information recording patch according to the sixth embodiment of the present invention. A first conductive region has a long side with a length to cause resonance with the frequency of a microwave sensor. A second conductive region has a size not to cause resonance with the frequency of a microwave sensor. The second conductive region is formed into a grid pattern, mesh pattern, mesh-like pattern made formed from minute dots, or arbitrary pattern by using hollow lines to change the conductivity.

An information recording patch F includes a protective layer 104, intermediate layer 105, metal layer 106, and adhesive layer 107. The metal layer 106 is segmented by hollow lines to form the first and second conductive regions.

A first conductive region 101 has a width and length that cause resonance with the frequency of a leakage microwave sensor. As shown in FIG. 18(*c*), an element having a vertical size of 4 mm and a horizontal size of 1 mm is arranged. The periphery of the element is defined by hollow lines. A second conductive region 102 has a size that does not cause resonance with the frequency of the leakage microwave sensor. This region is formed into a grid pattern with 1 mm×1 mm squares segmented by hollow lines and carries information for authenticity discrimination.

Each hollow line to form the first conductive region 101 and the second conductive region 102 is so thin as to be invisible or hard to see. A three-dimensional pattern may be formed on the intermediate layer 105 so that a holographic image which optically changes is obtained by stacking the metal layer 106 on the intermediate layer 105. If no optically changing function is necessary, the information recording patch can be used as that made of a smooth metal foil without a three-dimensional pattern on the intermediate layer 105. The adhesive layer 107 is necessary to paste the information recording patch to a paper sheet or the like. The protective layer 104 for protecting the surface may be omitted.

FIG. 18(*d*) shows a detected voltage upon reading the information recording patch F using a leakage microwave sensor 103. A detected voltage waveform a3 exhibited "high level" in the first conductive region 101 because of the resonance with the frequency of the leakage microwave sensor 103 and "low level" in the second conductive region 102 because of the absence of resonance with the frequency of the leakage microwave sensor 103. Since the detected voltage waveform a3 exhibits a unique waveform, it is possible to determine whether the information recording patch is authentic.

Figure 19:
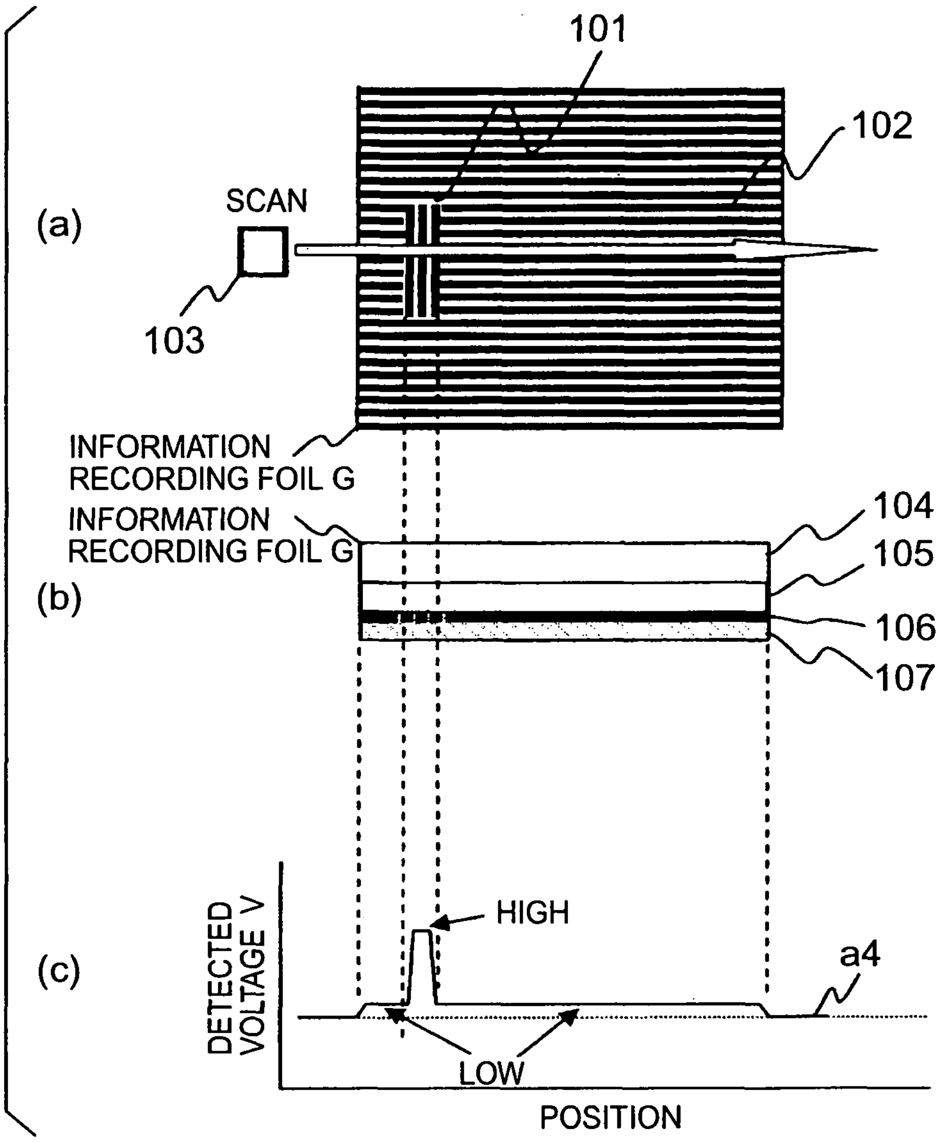
FIG. 19 shows explanatory views of the structure of an information recording patch and a detected voltage according to the seventh embodiment of the present invention.

FIG. 19 shows the structure of an information recording patch according to the seventh embodiment of the present invention. An information recording patch G shown in FIG. 19(*a*) includes a protective layer 104, intermediate layer 105, metal layer 106, and adhesive layer 107, as is apparent from the sectional view of FIG. 19(*b*). The metal layer 106 is segmented by hollow lines to form a first conductive region 101 having vertical lines and a second conductive region 102 having horizontal lines.

The first conductive region 101 has a shape that causes resonance with the frequency of a leakage microwave sensor 103. Three lines each having a width of 0.5 mm and a length of 4 mm are arranged. The second conductive region 102 has a shape that does not cause resonance with the frequency of the leakage microwave sensor 103. A plurality of lines each of which does not have a width of 0.5 mm and a length of 4 mm are arranged in parallel. The intermediate layer 105, adhesive layer 107, and protective layer 104 are the same as in the sixth embodiment shown in FIG. 18.

FIG. 19(*c*) shows a detected voltage upon reading the information recording patch G using the leakage microwave sensor 103. A detected voltage waveform a4 exhibited "high level" in the first conductive region 101 because of the resonance with the frequency of the leakage microwave sensor 103 and "low level" in the second conductive region 102 because of the absence of resonance with the frequency of the leakage microwave sensor 103. Since the detected voltage waveform a4 has a unique waveform, it is possible to discriminate the authenticity of the information recording patch.

As described in the sixth and seventh embodiments in detail, the information recording patch is apparently uniformly conductive but is finely segmented by hollow lines in fact. When the information recording patch is read by the leakage microwave sensor, a unique detected voltage waveform based on the first conductive region and the second conductive region is obtained. It is therefore possible to accurately discriminate the authenticity.

To form the information recording patch, for example, the following three methods are available.

(a) Direct Applying Method

In the direct applying method, the protective layer, intermediate layer, and metal layer are directly applied to a base material. The protective layer and intermediate layer can be formed by forming a coating directly on a base material using an applicator, coater, or various kinds of printing machines. For stable mechanical reading, a method such as screen printing, gravure printing, or intaglio printing capable of obtaining a large ink transfer amount is preferable. The hollow lines to segment the first conductive region 101 and the second conductive region 102 can be formed by, e.g., placing a masking film and performing vapor deposition using a vapor deposition apparatus.

(b) Retransfer Method

The materials are arranged on a transfer base material and retransferred to a base material by, e.g., heat, pressure, or (adhesive). For stable mechanical reading, it is preferable to form a uniform transfer film by thermal transfer printing or hot stamping.

(c) Label Method

The materials are arranged on a label base material and pasted to a base material by, e.g., an applied adhesive. For stable mechanical reading, it is preferable to form a uniform transfer film by thermal transfer printing or hot stamping.

The thickness of the metal layer is preferably 400 to 2,000 Å. If the conductive layer is thinner than 400 Å, it is difficult to obtain a sufficient voltage in detection by mechanical reading. If the conductive layer is thicker than 2,000 Å, the flexibility of the hologram becomes slightly poor.

(Mechanical Reading Method)

A method of mechanically reading the information recording patch obtained by each of the sixth and seventh embodiments will be described next.

(Explanation of Principles)

To read the information recording patch of each of the sixth and seventh embodiments, it is necessary to use a mechanical reading apparatus capable of detecting the conductivity and waveform resonance. The sensor for reading the information recording patch of each of the sixth and seventh embodiments is the same as the sensor for reading the information recording patch of each of the first to fifth embodiments, and a description thereof will not be repeated.

In Examples 4 to 8, reading is performed using a leakage microwave sensor shown in FIG. 10. As shown in FIG. 10, a Doppler module used in an automatic door or speed sensor is used as a component that serves as both an irradiation means 9 and a receiving means 10. The Doppler module comprises a transmitting diode 19, transmitting antenna 18, receiving diode 22, and receiving antenna 21 in a square waveguide WR42 and can transmit or receive an electromagnetic wave of 24.15 GHz in the TE10 mode.

In this embodiment, a leakage microwave sensor is used as a mechanical reading sensor. However, any other sensor capable of reading a conductor or a dielectric is usable. For example, information of the information recording patch may be read using a capacitance sensor to read a dielectric and an eddy current sensor to read a conductor.

A method of reading, using the leakage microwave sensor, a conductive layer formed into a length that causes resonance with a frequency will be described next. The conductive layer is formed into a desired length and a desired width using a material having a high electric conductivity and arranged to express information.

Figure 20:
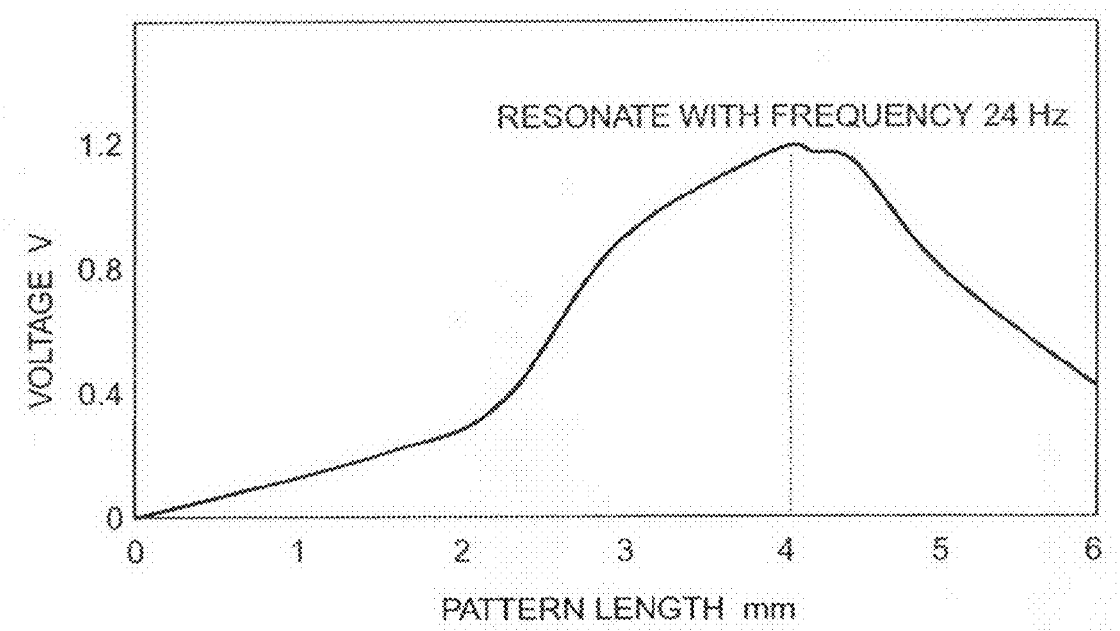
FIG. 20 is a graph showing a voltage upon detecting the information recording patch.

FIG. 20 is a graph showing the length of the pattern of the first conductive region of a metal layer plotted along the abscissa and a microwave detected voltage plotted along the ordinate. The microwave is an electromagnetic wave. Its frequency (GHz) and waveform (mm) are given below.

wavelength $\lambda = c/f$ (c: velocity of light, f: frequency)

The resonant wavelength of the antenna for the electromagnetic wave is a fraction of an integer of the wavelength λ. The value of the microwave detected voltage is affected by various factors as described above. Microwave detected voltages of smooth conductors having various lengths were actually measured using a microwave transmitter/receiver of 24.15 GHz.

According to the experiments, the highest microwave detected voltage can be obtained from an about 4-mm long conductor based on various factors, as shown in FIG. 20. Because of the presence of various factors, in Examples 4 to 8, the length of the conductor was set to "almost" a fraction of an integer of the electromagnetic wave wavelength. According to the experiments, generally, the detected voltage of a smooth conductor whose length was about ¼ the wavelength of the detection microwave was high. The maximum value of the microwave detected voltage was observed at lengths corresponding to $\frac{1}{2}^n$ (n is an integer: n≥0), i.e., ½, ⅛, 1/16, . . . .

Detailed Examples 4 to 8 using the information recording patch will be described next.

Example 4

Figure 21:
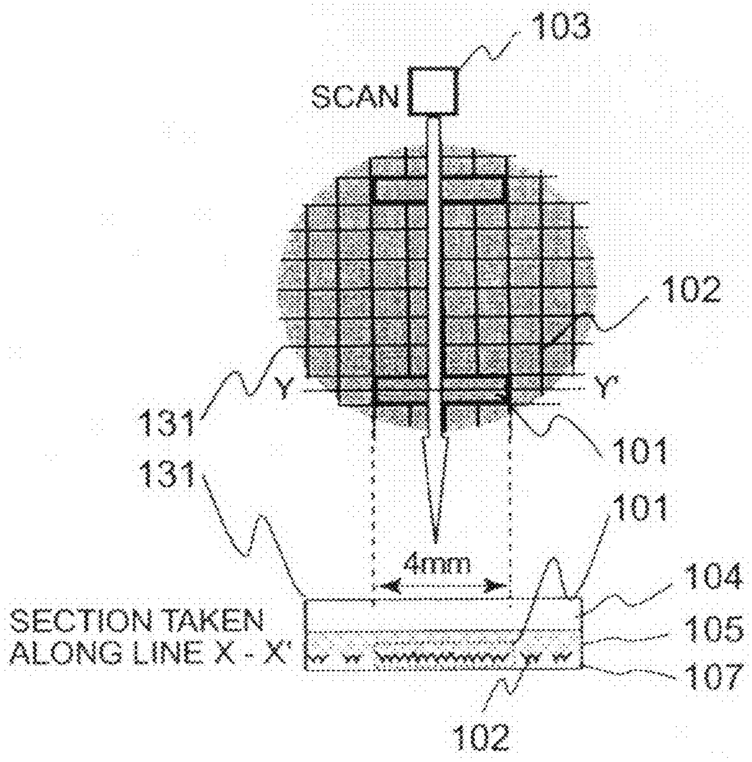
FIG. 21 is an explanatory view of the structure of an information recording patch according to Example 4 of the sixth and seventh embodiments.
Figure 22:
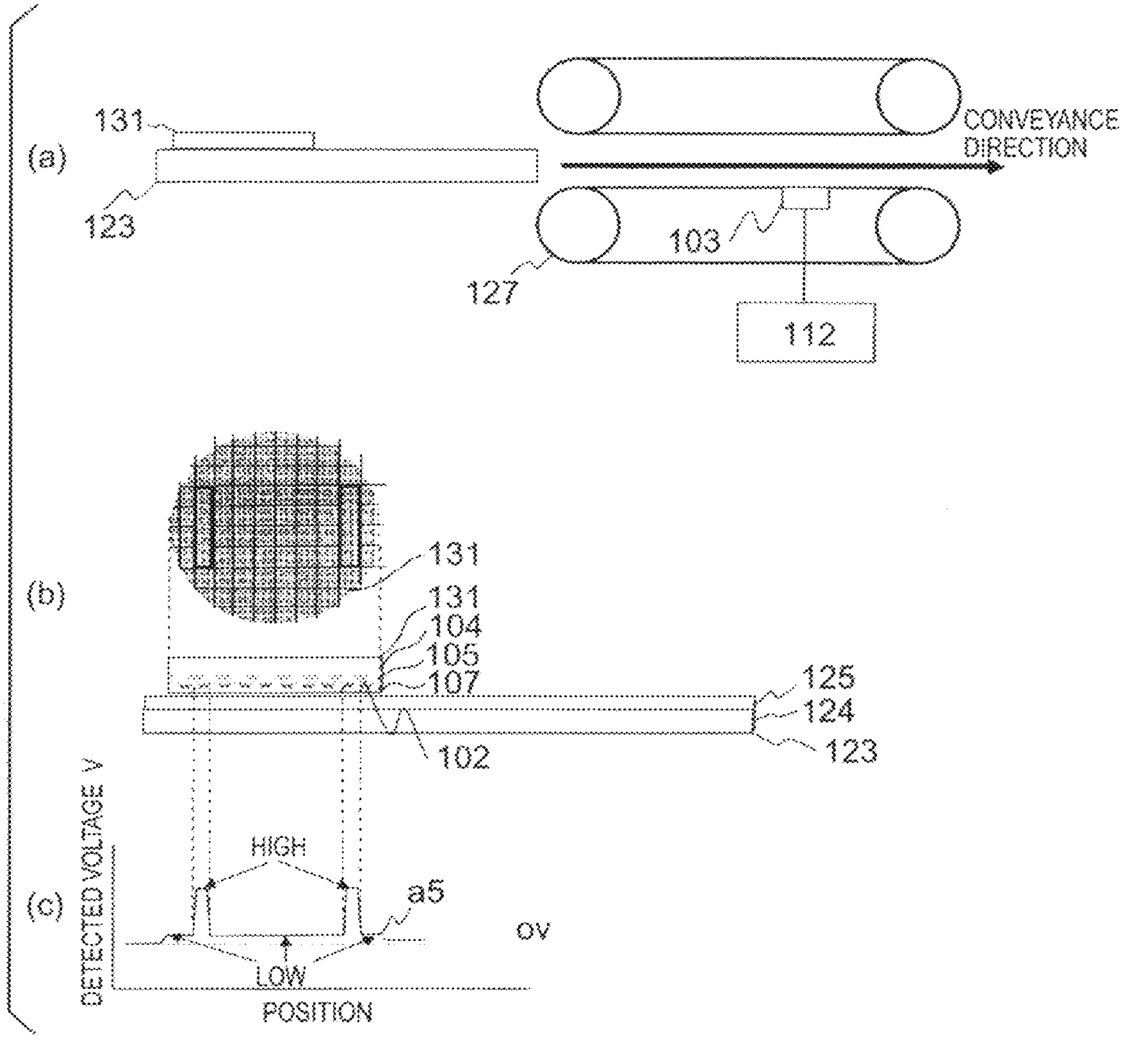
FIG. 22 shows views of examples of an identification card, conveyor, and detected voltage according to Example 4.
Figure 23:
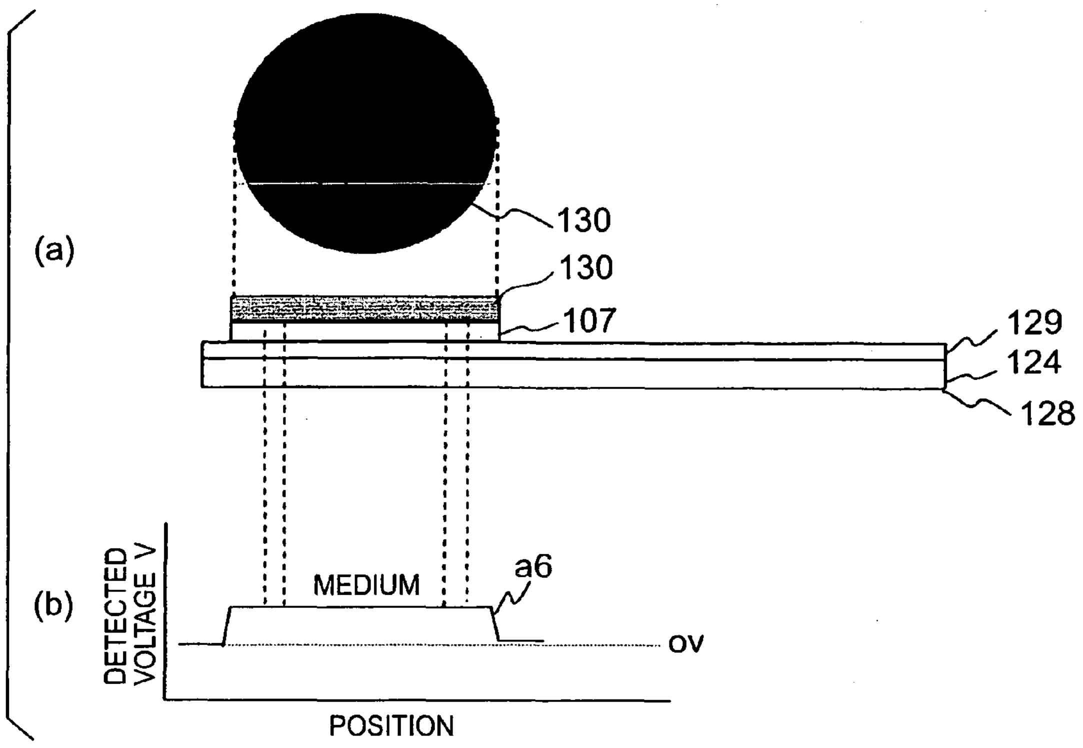
FIG. 23 shows views of an example of a forged product according to Example 4.

FIG. 21 shows, as Example 4, an example of the structure of an identification card with an information recording patch and a reading method therefor. FIGS. 21(*a*) and 21(*b*), and 22(*b*) show an information recording patch that allows authenticity discrimination. FIG. 22(*a*) shows a reading apparatus. FIG. 22(*c*) shows a detected voltage upon reading an authentic identification card with the information recording patch in the scanning direction. FIGS. 23(*b*) and 24(*b*) show detected voltages upon reading forged products shown in FIGS. 23(*a*) and 24(*a*) by the reading apparatus, respectively.

An information recording patch 131 shown in FIG. 21(*a*) includes the first conductive regions 101 each having a width and length that cause resonance with the frequency of the leakage microwave sensor, and the second conductive region 102 which does not resonate with the frequency and is formed from the protective layer 104, intermediate layer 105, metal layer (the first conductive layer 101 and the second conductive layer 102), and adhesive layer 107.

Each first conductive region 101 was formed into a shape having a width and length that cause resonance with the frequency of the leakage microwave sensor. As shown in FIG. 21(*b*), two elements each having a vertical size of 4 mm and a horizontal size of 1 mm were arranged. The second conductive region 102 was formed into a hollow grid or mesh pattern not to resonate with the frequency of the leakage microwave sensor. Blocks each having a vertical size of 1 mm and a horizontal size of 1 mm were two-dimensionally arranged.

A three-dimensional pattern was formed on the intermediate layer 105 so that the intermediate layer 105 and the metal layer (the first conductive layer 101 and the second conductive layer 102) stacked on it form a hologram layer, i.e., has a function of causing an optical change. The adhesive layer 107 is used to paste the information recording patch 131 to the identification card. The protective layer 104 for protecting the surface may be omitted.

FIG. 22(*b*) shows the structure of an identification card 123 of Example 4. The identification card 123 includes a base material 124 for the identification card, an ink layer 125, and the information recording patch 131.

FIG. 22(*a*) shows a state in which a conveyor 127 conveys the identification card 123 with the information recording patch 131 to perform measurement. The leakage microwave sensor 103 is attached to the conveyor 127. An oscilloscope 112 displays the detected voltage of the leakage microwave sensor 103 upon conveying the identification card 123.

A 0.3-mm thick PET film was used as the base material 124 for the identification card. Any other material having a desired dielectric constant is usable except for PET. The thickness is preferably about 0.3 to 0.75 mm. The ink layer 125 formed by printing information and a design necessary for the identification card has a desired dielectric constant. Printing was performed to an ink thickness of about 1 μm by offset printing. The protective layer and the intermediate layer were made of a polyethylene resin. In Example 4, the intermediate layer was formed using a 0.1-mm thick PET film. A three-dimensional pattern for an optical change in a hologram was formed.

The first conductive regions and the second conductive region of the information recording patch were formed by depositing aluminum on the intermediate layer. Hollow lines each having a width of 0.1 mm were formed by etching.

In Example 4, the first conductive regions and the second conductive region were formed by aluminum vapor deposition to a film thickness of 500 Å. However, any other material such as chromium is also usable if a desired conductivity can be obtained.

The first conductive region were defined by the hollow lines into a size (vertical size of 4 mm×horizontal size of 1 mm) that causes resonance with the frequency 24.15 GHz and arranged on the left and right sides, respectively. The second conductive region was segmented, by the hollow lines, into sizes (grid pattern with 1 mm×1 mm squares) that do not cause resonance with the frequency 24.15 GHz. Each hollow line is so thin as to be invisible or hard to see.

When the base material 124, ink layer 125, protective layer 104, and intermediate layer 105 made of dielectric materials were measured by the leakage microwave sensor 103, the detected voltage level was much lower than that of the information recording patch. Such a level is supposed to be negligible and is therefor not taken into consideration in Example 4.

FIG. 22(*c*) shows a detected voltage waveform a5 obtained by measuring the identification card using the apparatus shown in FIG. 22(*a*). The waveform a5 exhibited "high level" in the first conductive regions, "low level" in the second conductive region, and about 0 V in portions of the identification card 123 without the information recording patch. It is therefore possible to discriminated the authenticity of the identification card 123.

FIG. 23 shows an example of a forged product 128 of the identification card. As shown in the sectional view, a color copy layer 129 is formed on the base material 124 in place of the ink layer of the authentic identification card, and an available aluminum foil 130 is pasted via the adhesive layer 107 in place of the metal layer of the information recording patch of the authentic identification card. FIG. 23(*b*) shows a detected voltage waveform a6.

The forged product is different from the authentic identification card in two points. As one point, the metal layer is thick. For this reason, the whole region of the hologram exhibits "medium level" upon measurement using the leakage microwave sensor 103. The other point is that the aluminum foil 130 is not segmented by hollow lines, and the first conductive regions 101 and the second conductive region 102 of the authentic identification card do not exist. Hence, no region resonates with the frequency (24.15 GHz) of the first conductive region upon measurement using the leakage microwave sensor 103. Due to the two reasons, the forged product exhibits the detected voltage waveform a6 upon measurement using the leakage microwave sensor 103. It is therefore possible to determine that the identification card is a forged product.

Figure 24:
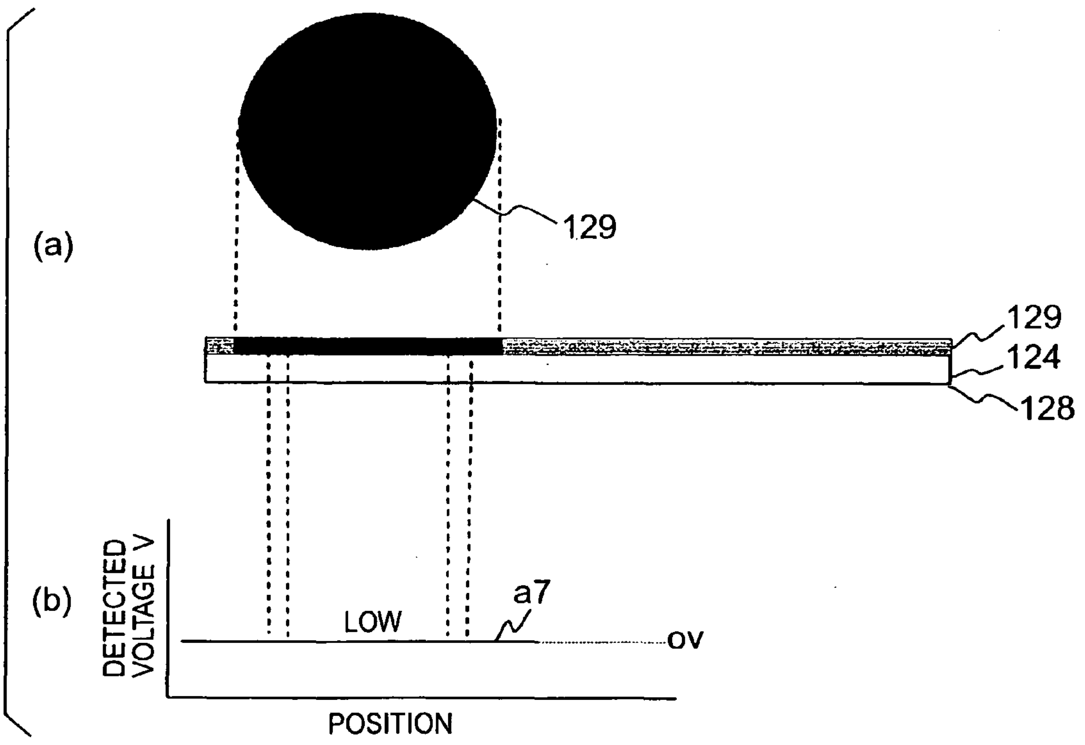
FIG. 24 shows views of another example of a forged product according to Example 4.

FIG. 24 shows another example of the forged product 128 of the identification card. As shown in the sectional view, the color copy layer 129 is formed on the base material 124 in place of the ink layer of the authentic identification card. Similarly, a color copy layer is formed using a color copying machine in place of the metal layer of the information recording patch of the authentic identification card, thereby forging the identification card.

FIG. 24(*b*) shows a detected voltage waveform a7.

The forged product is different from the authentic product in the following points. That is, since no metal layer of aluminum is present, the whole region of the hologram exhibits about 0 V upon measurement using the leakage microwave sensor 103. Additionally, since the first conductive regions 101 do not exist, no level resonant with the frequency (24.15 GHz) is obtained. It is possible to determine on the basis of the two differences that the identification card is a forged product.

Example 5

Figure 25:
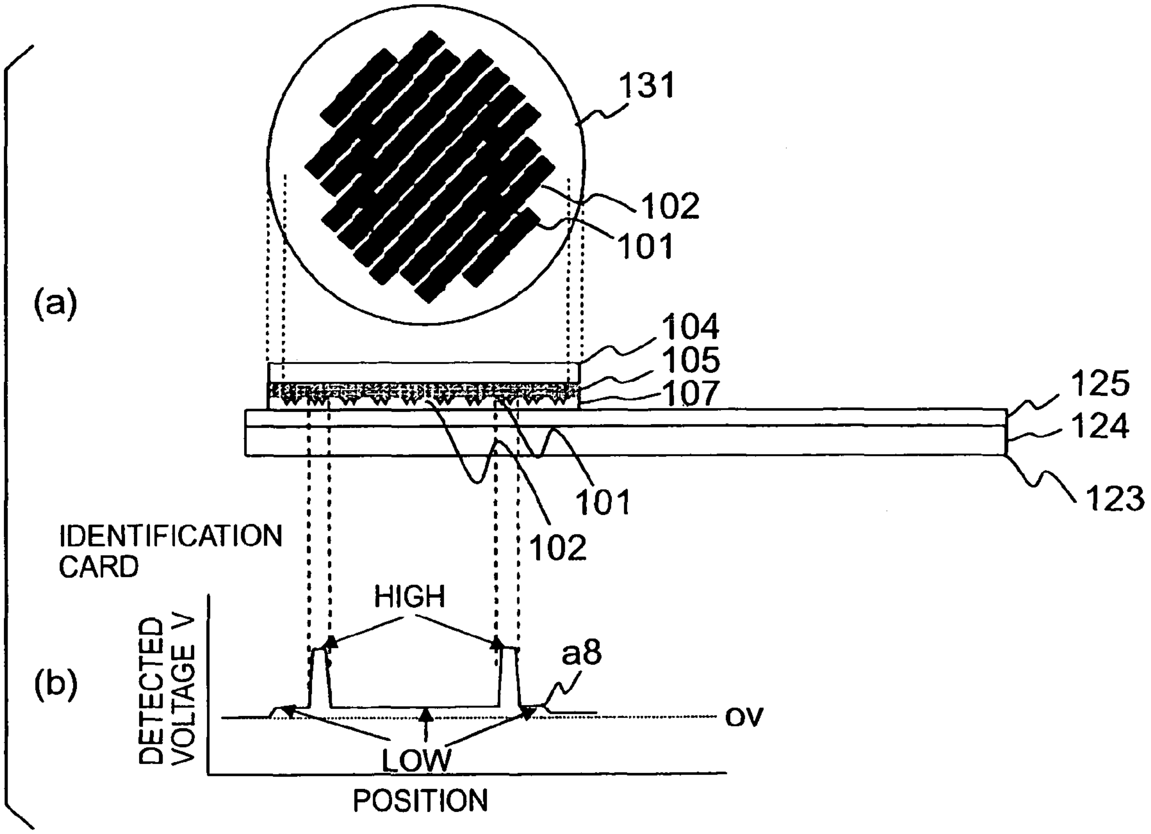
FIG. 25 shows views of examples of an identification card and a detected voltage according to Example 5 of the sixth and seventh embodiments.

FIG. 25 shows another example of the identification card 123 with the information recording patch 131. The identification card 123 includes the base material 124 for the identification card, the ink layer 125, and the information recording patch 131.

In Example 4, the information recording patch had a mesh pattern formed by vertically arranging hollow lines in the longitudinal direction and horizontally arranging hollow lines in the lateral direction. In the information recording patch of Example 5, hollow lines in the longitudinal direction and those in the lateral direction were arranged obliquely. The second conductive region 102 had a design as an aggregate of rhombuses, whereas each first conductive region 101 was designed by connecting some rhombuses to a length that causes resonance with the leakage microwave sensor 103. Hence, as compared to the information recording patch 131 of Example 4 shown in FIG. 22(*b*), the presence of the first conductive regions 101 is more hard to confirm.

FIG. 25(*b*) shows a detected voltage waveform a8. The waveform a8 exhibited "high level" in the first conductive regions 101, "low level" in the second conductive region 102, and about 0 V in portions of the identification card 123 without the information recording patch. It is therefore possible to discriminate the authenticity of the identification card 123.

Example 6

Figure 26:
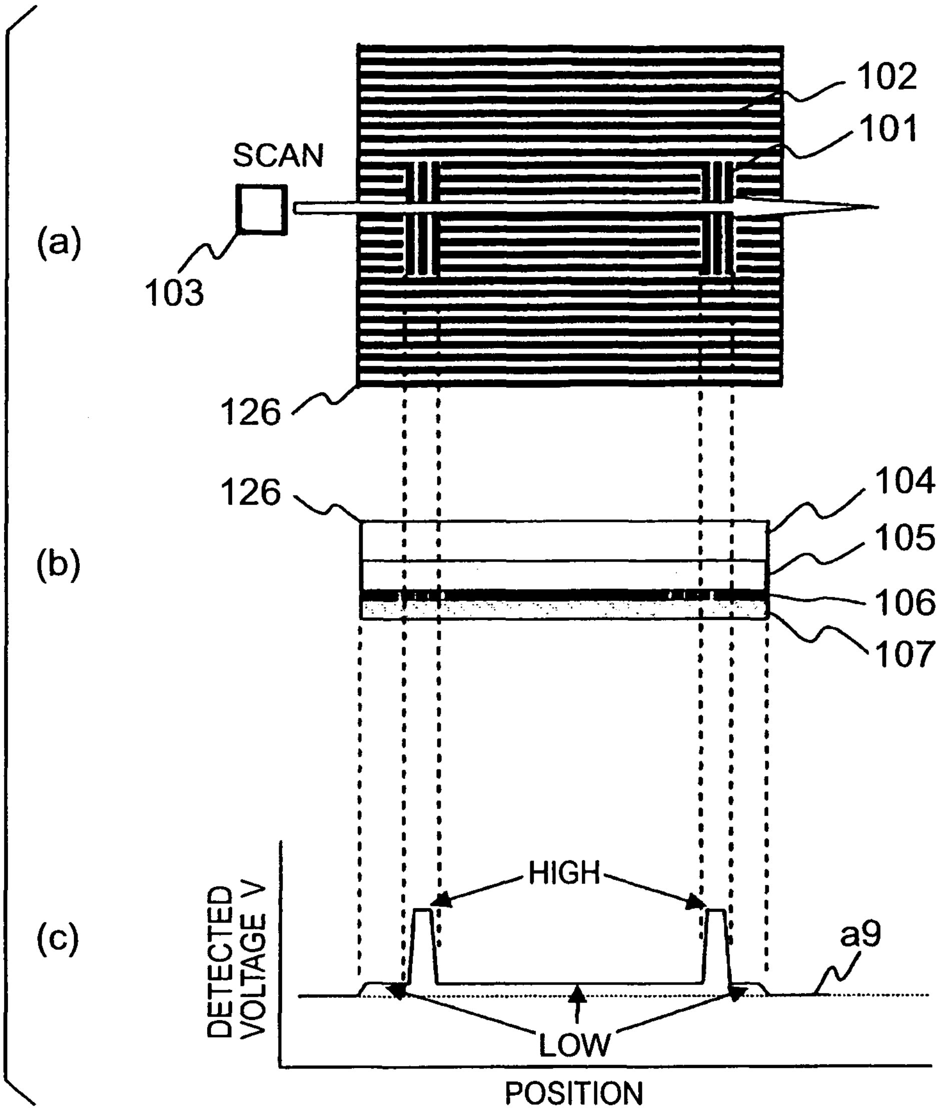
FIG. 26 shows views of an example of an information recording patch according to Example 6 of the sixth and seventh embodiments.

FIG. 26 shows another example of an information recording patch 126. In Example 6, the information recording patch 126 including the protective layer 104, intermediate layer 105, and metal layer 106 can be pasted to a document or the like via the adhesive layer 107.

The metal layer 106 is segmented by hollow lines to form first conductive regions 101 each having vertical stripes and a second conductive region 102 having horizontal stripes. Each first conductive region 101 has a shape that causes resonance with the frequency of the leakage microwave sensor 103. Three lines each having a width of 0.5 mm and a length of 4 mm are arranged at two points. The second conductive region 102 has a shape that does not cause resonance with the frequency of the leakage microwave sensor. A plurality of lines each of which does not have a width of 0.5 mm and a length of 4 mm are arranged in parallel. Hence, the presence of the first conductive regions 101 is hard to confirm.

FIG. 26(*c*) shows a detected voltage waveform a9. The waveform a9 exhibited "high level" in the two first conductive regions 101 and "low level" in the second conductive region 102. It is therefore possible to determine that the information recording patch 126 pasted to a document or the like is authentic.

Example 7

Figure 27:
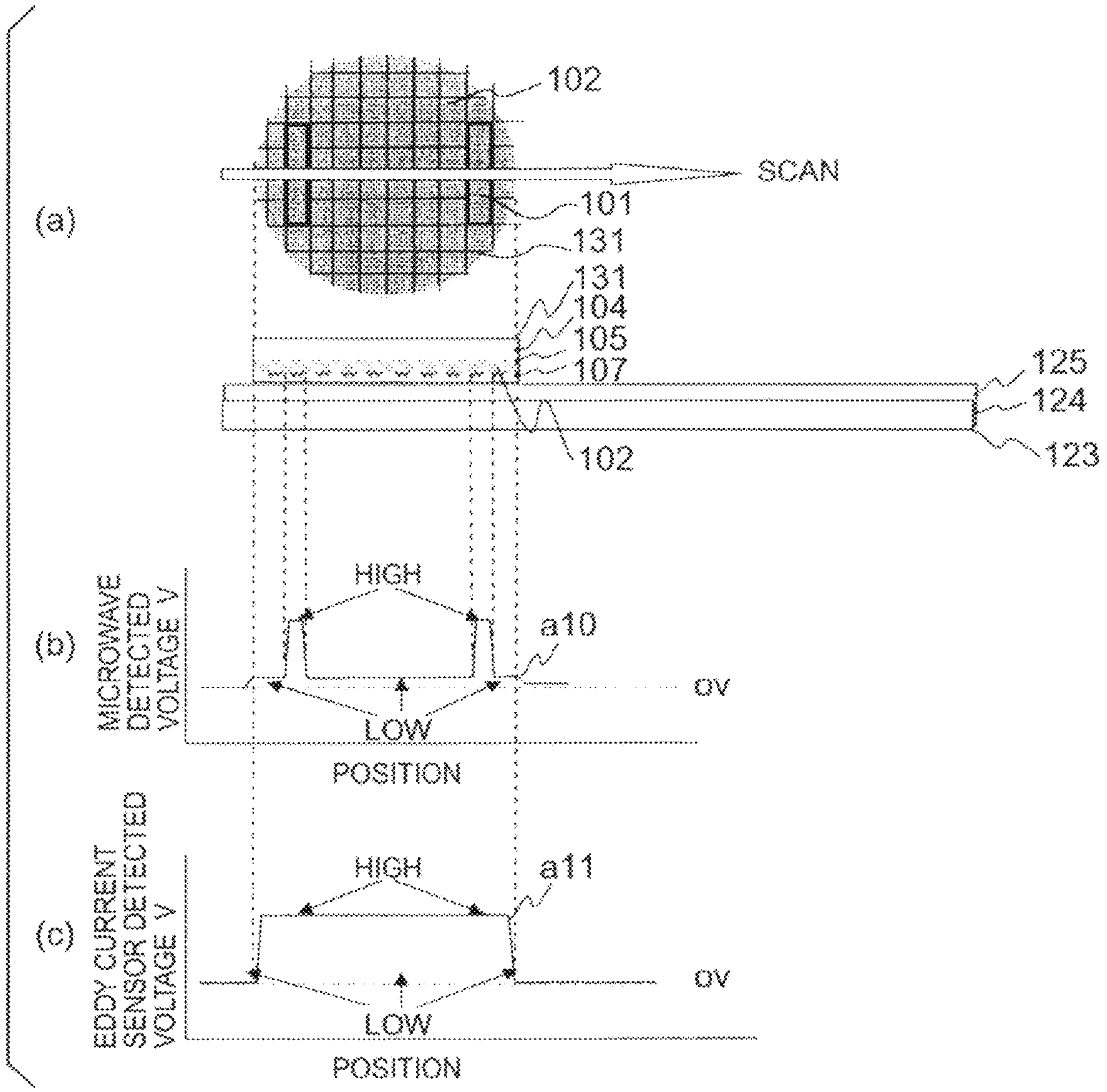
FIG. 27 shows views of examples of an identification card and a detected voltage according to Example 7 of the sixth and seventh embodiments.
Figure 28:
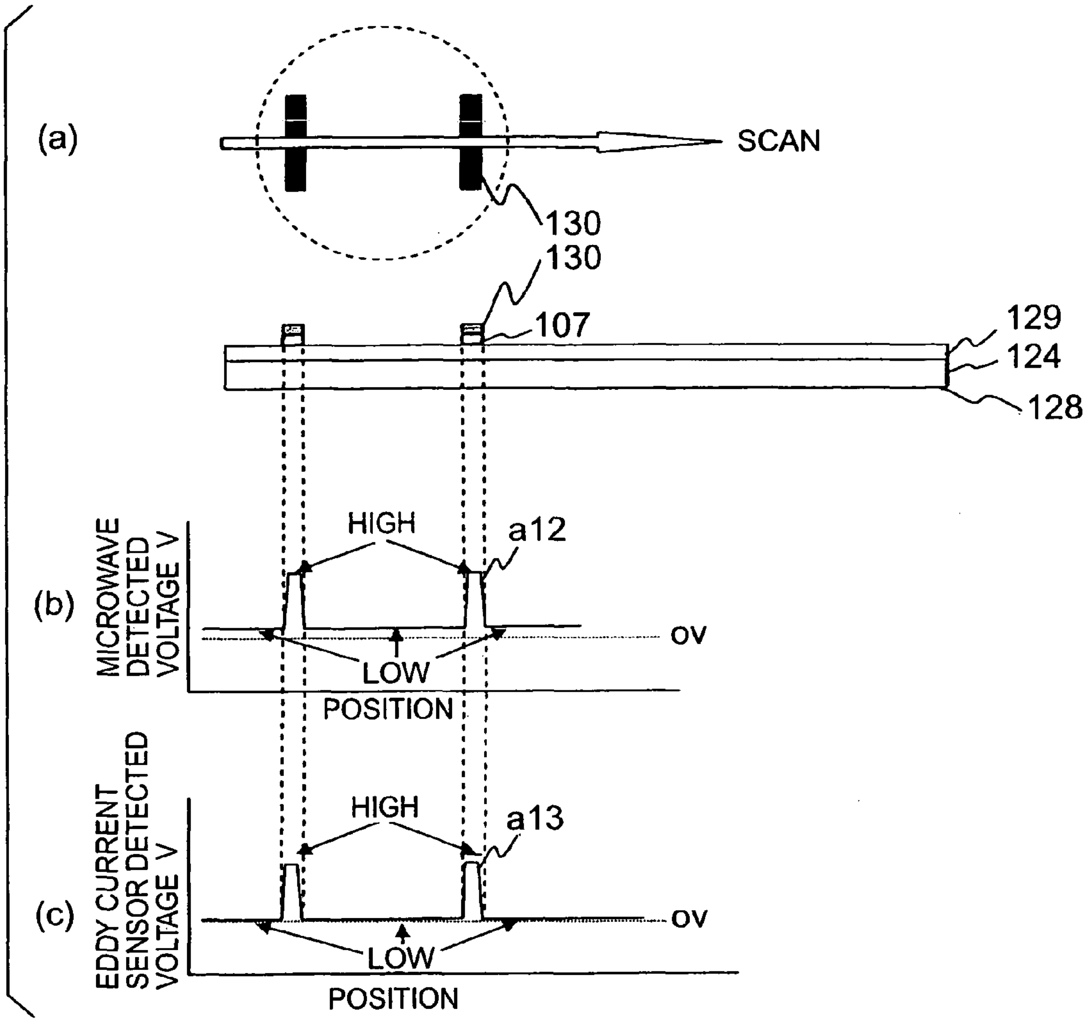
FIG. 28 shows views of an example of a forged product according to Example 7.
Figure 29:
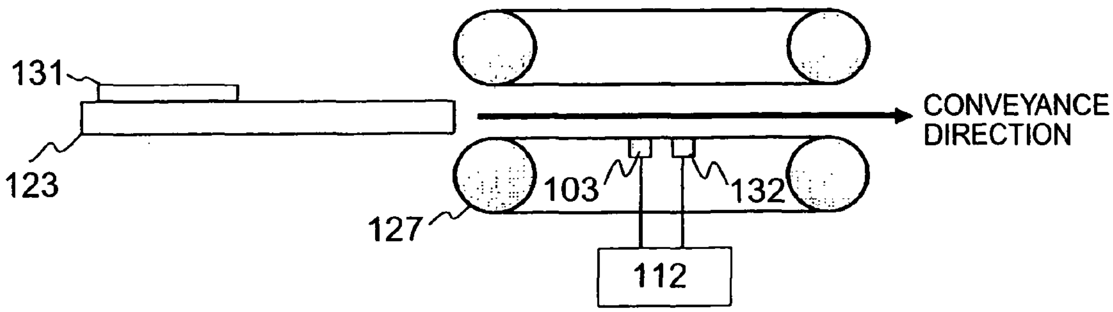
FIG. 29 is a view showing an example of a conveyor according to Example 7.

FIGS. 27 to 29 are views for explaining Example 7. After reading using a leakage microwave sensor, reading is further performed using an eddy current sensor capable of detecting a material, thereby enhancing the authenticity discrimination effect.

FIG. 27 shows the structure of the identification card 123 with the authentic information recording medium 131, a detected voltage obtained by reading the identification card in the scanning direction using a leakage microwave sensor, and a detected voltage obtained by reading in the scanning direction using an eddy current sensor.

FIG. 28 shows the structure of a forged identification card formed by pasting the aluminum foil 130 to portions corresponding to the first conductive regions of the authentic information recording medium so as to obtain the same detected voltage as in the authentic product by the leakage microwave sensor, a detected voltage obtained by reading the forged identification card in the scanning direction using a leakage microwave sensor, and a detected voltage obtained by reading in the scanning direction using an eddy current sensor. The information recording medium shown in FIG. 27 has the same structure as in Example 4.

FIG. 29 shows a reading apparatus using a leakage microwave sensor and an eddy current sensor. FIG. 29 shows a state in which the conveyor 127 conveys the identification card 123 with the information recording patch 131 to perform measurement. The leakage microwave sensor 103 and an eddy current sensor 132 are attached to the conveyor 127. The oscilloscope 112 displays the detected voltages of the leakage microwave sensor 103 and the eddy current sensor 132 upon conveying the identification card 123.

A process of discriminating the identification card will be described with reference to FIG. 27. A detected voltage waveform a10 shown in FIG. 27(*b*) is a result obtained by measuring the identification card 123 conveyed by the conveyor 127 in FIG. 29 at the portion of the leakage microwave sensor 103. The waveform a10 exhibited "high level" in the first conductive regions that resonated with the microwave, "low level" in the second conductive region that did not resonate, and 0 V in portions without the information recording patch.

A detected voltage waveform all shown in FIG. 27(*c*) is a result obtained by measuring the conveyed identification card 123 at the portion of the eddy current sensor 132 of the conveyor 127 in FIG. 29. The detected voltage waveform all exhibited "high level" all over the information recording medium because the eddy current sensor 132 which reacts to a metal detected both the first conductive regions 101 and the second conductive region 102 of the information recording medium 131 of the identification card 123.

FIG. 28 explains a process of discriminating the forged product 128 of the identification card. As shown in the sectional view of FIG. 28(*a*), the color copy layer 129 is formed on the base material 124 in place of the ink layer of the authentic identification card, and the available aluminum foil 130 is pasted via the adhesive layer 107 in place of the first conductive region metal layer of the authentic information recording patch.

A detected voltage waveform a12 shown in FIG. 28(*b*) is a result obtained by measuring the forged product 128 at the portion of the leakage microwave sensor 103 of the reading apparatus shown in FIG. 29. The waveform a12 exhibited "high level" in portions corresponding to the first conductive regions of the authentic product because of the aluminum foil 130, about 0 V in a portion corresponding to the second conductive region of the authentic product because nothing existed, and 0 V in portions without the information recording patch.

A detected voltage waveform a13 shown in FIG. 28(*c*) is a result obtained by measuring the forged product at the portion of the eddy current sensor 132 of the reading apparatus in FIG. 29. The eddy current sensor 132 which reacts to a metal detected the aluminum foil 130 corresponding to each first conductive region of the authentic information recording medium. However, since nothing existed in the portion corresponding to each first conductive region, the waveform exhibited 0 V.

As described above, as the method of discriminating the authenticity of the identification card with the information recording patch, the leakage microwave sensor 103 is used as the first sensor of the reading apparatus, and the eddy current sensor 132 is used as the second sensor to detect that, in an authentic product, the pasted information recording medium has conductivity in the whole region and partially resonates with a microwave. This allows to more accurately discriminate the authenticity of the identification card 123.

Example 8

Figure 30:
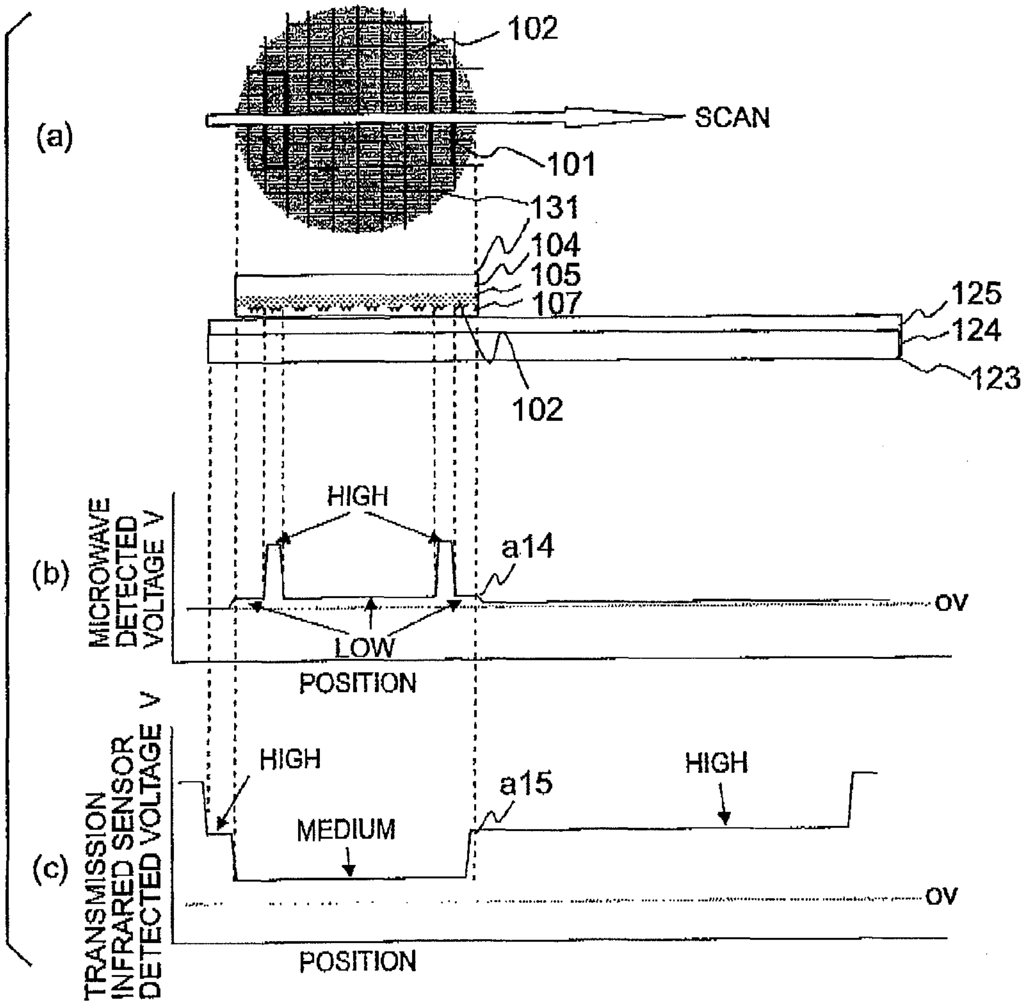
FIG. 30 shows views of examples of an identification card and a detected voltage according to Example 8 of the sixth and seventh embodiments.
Figure 31:
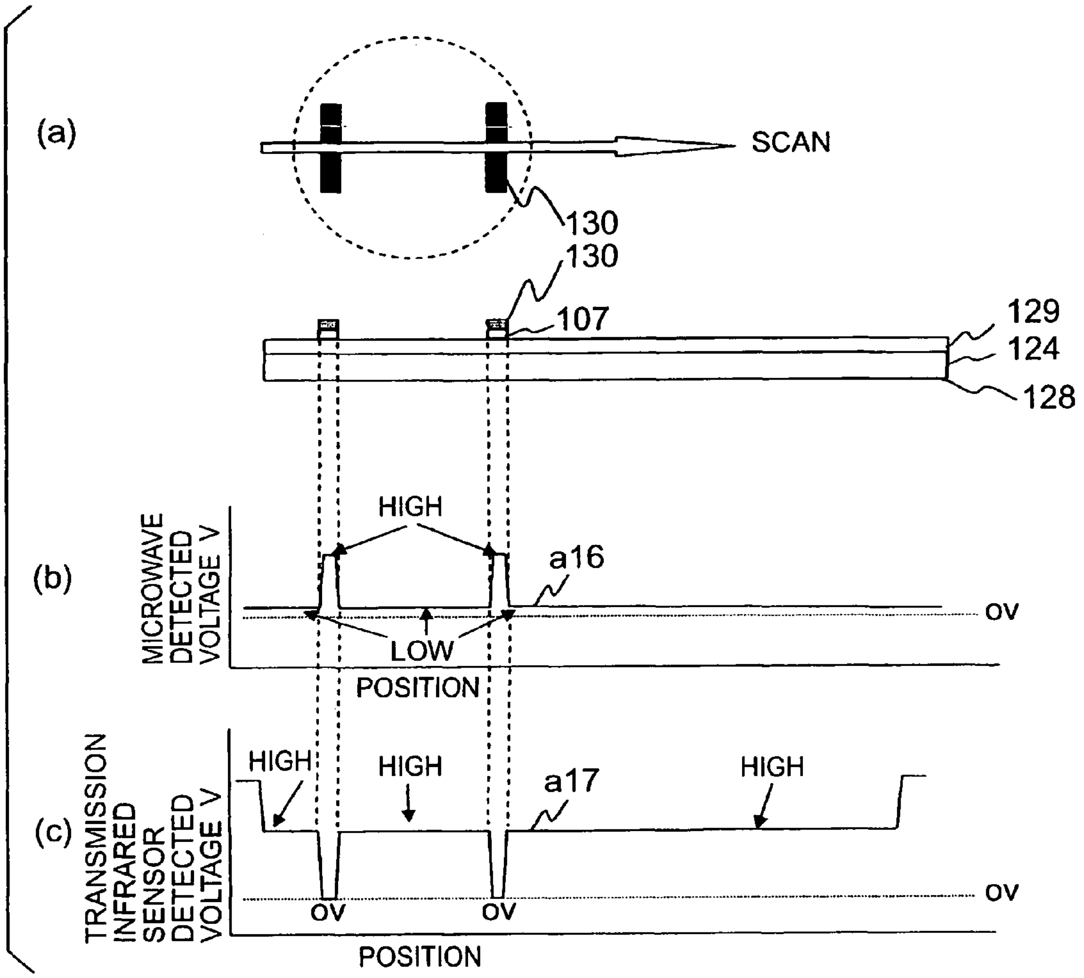
FIG. 31 shows views of an example of a forged product according to Example 8.
Figure 32:
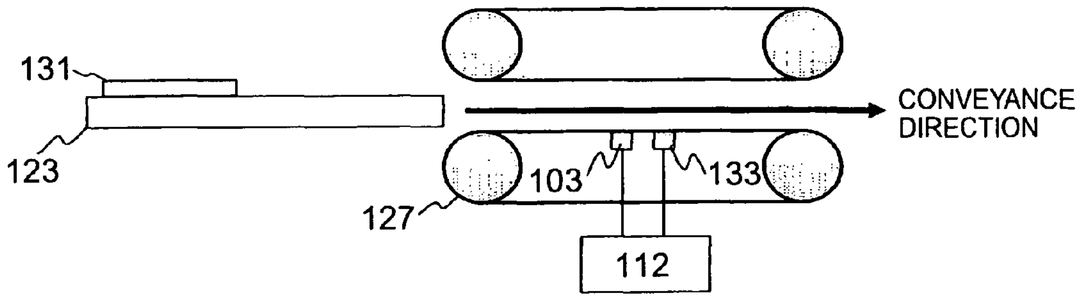
FIG. 32 is a view showing an example of a conveyor according to Example 8.

FIGS. 30 to 32 are views for explaining Example 8. After reading using a leakage microwave sensor, reading is further performed using a transmission infrared sensor capable of detecting a light transmission amount, thereby enhancing the authenticity discrimination effect.

FIG. 30 shows the structure of the identification card 123 with the authentic information recording medium 131, a detected voltage obtained by reading the identification card in the scanning direction using a leakage microwave sensor, and a detected voltage obtained by reading in the scanning direction using a transmission infrared sensor 133.

FIG. 31 shows the structure of a forged identification card formed by pasting the aluminum foil 130 to portions corresponding to the first conductive regions of the authentic information recording medium so as to obtain the same detected voltage as in the authentic product by the leakage microwave sensor, a detected voltage obtained by reading the forged identification card in the scanning direction using a leakage microwave sensor, and a detected voltage obtained by reading in the scanning direction using the transmission infrared sensor 133. The information recording medium shown in FIG. 30 has the same structure as in Example 4.

FIG. 32 shows a reading apparatus using a leakage microwave sensor and the transmission infrared sensor 133. FIG. 32 shows a state in which the conveyor 127 conveys the identification card 123 with the information recording patch 131 to perform measurement. The leakage microwave sensor 103 and the transmission infrared sensor 133 are attached to the conveyor 127. The oscilloscope 112 displays the detected voltages of the leakage microwave sensor 103 and the transmission infrared sensor 133 upon conveying the identification card 123.

A process of discriminating the identification card will be described with reference to FIG. 30. A detected voltage waveform a14 shown in FIG. 30(*b*) is a result obtained by measuring the identification card 123 conveyed by the conveyor 127 in FIG. 32 at the portion of the leakage microwave sensor 103. The waveform a14 exhibited "high level" in the first conductive regions that resonated with the microwave, "low level" in the second conductive region that did not resonate, and 0 V in portions without the information recording patch.

A detected voltage waveform a15 shown in FIG. 30(*c*) is a result obtained by measuring the conveyed identification card 123 at the portion of the transmission infrared sensor 133 of the conveyor 127 in FIG. 32. The transmission infrared sensor 133 performs detection based on the spectral reflectance characteristics of the base material 124 for the identification card, the ink layer 125, protective layer 104, intermediate layer 105, first conductive regions, 101, and second conductive region 102.

The waveform exhibited "high level" in the portion of the base material layer 124 without the information recording patch 131. The waveform exhibited "medium level" in the first conductive regions 101 and the second conductive region 102 which were formed in this example by aluminum vapor deposition to a film thickness of 500 Å because of the relationship between the vapor deposition thickness and the infrared light transmission amount. The first conductive regions 101 and the second conductive region 102 are finely segmented by, e.g., a negative and positive pattern of hollow lines. The lines are thin and therefore do not exhibit any level in the detected voltage waveform a15 because of the resolving power of the transmission infrared sensor 133.

FIG. 31 explains a process of discriminating the forged product 128 of the identification card. As shown in the sectional view of FIG. 31(*a*), the color copy layer 129 is formed on the base material 124 in place of the ink layer of the authentic identification card, and the available aluminum foil 130 is pasted via the adhesive layer 107 in place of the first conductive region metal layer of the authentic information recording patch.

A detected voltage waveform a16 shown in FIG. 31(*b*) is a result obtained by measuring the forged product 128 at the portion of the leakage microwave sensor 103 of the reading apparatus shown in FIG. 32. The waveform a16 exhibited "high level" in portions corresponding to the first conductive regions of the authentic product because of the aluminum foil 130, about 0 V in a portion corresponding to the second conductive region of the authentic product because nothing existed, and 0 V in portions without the information recording patch.

A detected voltage waveform a17 shown in FIG. 31(*c*) is a result obtained by measuring the forged product at the portion of the transmission infrared sensor 133 of the reading apparatus in FIG. 32. The waveform exhibited "high level" in the portion of the base material layer 124 having no information recording patch because it readily passed infrared light. The waveform exhibited about 0 V in each portion corresponding to the first conductive region which had the aluminum foil 130 pasted and did not pass the infrared light, and "high level" in a portion corresponding to the second conductive region without the aluminum foil 130, as in the base material layer 124.

As described above, as the method of discriminating the authenticity of the identification card with the information recording patch, the leakage microwave sensor 103 is used as the first sensor of the reading apparatus, and the transmission infrared sensor 133 is used as the second sensor to detect that, in an authentic product, the pasted information recording medium exhibits "medium level" in the whole region because it is formed by aluminum vapor deposition to a film thickness of 500 Å, and partially resonates with a microwave. This allows to more accurately discriminate the authenticity of the identification card 123.

As is apparent from Examples 4 to 8 described above, the information recording patch of the present invention is formed by arranging, on a foil, a region that resonates with the leakage microwave sensor and a region that does not resonate in arbitrary shapes so that it can carry information. Such an information recording patch is pasted to a identification card, card, or various articles of value, thereby preventing forgery. In Examples 4 to 8 described above, hollow lines are formed in the metal deposited layer to form the first conductive regions 101 and the second conductive region 102. Any other design is also usable if it can obtain the same effect.

As described above, according to the sixth and seventh embodiments, there are provided a printed sheet such as a paper sheet having an information recording patch formed not by arranging only a metal such as aluminum but by partially adhering a metal (conductor) to a resin base material, and an authenticity discrimination method therefor.

More specifically, it is possible to discriminate authenticity, by forming a leakage hole in a waveguide which generates a standing wave and using a microwave that is a leaked polarized wave, on the basis of the resonance characteristic and shielding characteristic of a metal adhered region, and the dielectric characteristic of a metal non-adhered region on the resin base material and a printed sheet such as a paper sheet. This enables inexpensive and reliable authenticity discrimination of a forged product formed using a metallization technique or a flexible paper sheet or the like that is being conveyed.

To make it difficult to find the structure of information embedded in the information recording patch, metal adhered regions without the resonance characteristic are arranged in a grid pattern. As a result, unique detected voltage waveforms are obtained upon mechanical reading in a metal adhered region that resonates and a metal adhered region that does not resonate.

As described above, according to the information recording patch of each of the sixth and seventh embodiments, a conductive region that resonates with a microwave is arranged in a metal layer while being surrounded by another conductive region that does not resonate with the microwave. Hence, the information recording patch apparently has no information. In fact, however, the metal layer portion is finely segmented by, e.g., a negative and positive pattern of hollow lines. For this reason, upon mechanical reading, unique detected voltage waveforms are obtained in two regions, i.e., the first conductive region that resonates with the frequency of a microwave sensor and the second conductive region that does not resonate with the frequency of the microwave sensor. It is therefore possible to perform accurate authenticity discrimination.

In the information recording patch according to the above-described embodiments, a fine segmenting process using, e.g., a negative and positive pattern of hollow lines is performed at the time of manufacture. Hence, it is difficult to realize on the occasion of forgery that the information recording patch has information. Additionally, since the fine hollow lines are hard to reproduce, it is possible to effectively prevent forgery or data alteration.

When a hologram or the like is formed on the information recording patch, reflected light is diffracted by its optical change effect. This makes the negative and positive pattern of hollow lines more difficult to see.

The invention claimed is:

1. An information recording patch comprising:
- a plurality of first conductor adhered regions arranged on a surface of a resin base material, each of the first conductor adhered regions being spaced apart from each other on the surface of the resin base material by at least one conductor non-adhered region,
- a plurality of second conductor adhered regions arranged on a surface of the resin base material, each of the second conductor adhered regions being spaced apart from each other on the surface of the resin base material by the at least one conductor non-adhered region
- wherein each of the first conductor adhered regions has a long side whose length is $\frac{1}{2}^n$ (n is an integer: n≥0) of a predetermined wavelength, and each of the second conductor adhered regions has a long side that extends in a lengthwise direction is not parallel to a lengthwise direction of the long side of the first conductor adhered region, and the plurality of the first conductor adhered regions are arranged so as to be adjacent to the plurality of the second conductor adhered regions and to be seen as one uniform region.

2. An information recording patch according to claim 1, wherein each of said first conductor adhered regions has an anisotropic shape.

3. An information recording patch according to claim 2, wherein said each of said first conductor adhered regions has one of a rectangular shape and an elliptical shape.

4. An information recording patch affixed to a resin base material comprising:
- at least one conductive portion arranged on a surface of an intermediate layer,
- the surface of the intermediate layer being bonded to a surface of the resin base material by an adhesive layer so that the at least one conductive portion is sandwiched directly between the surface of the intermediate layer and the surface of the resin base material of the adhesive layer,
- wherein each of a surface area of the resin base material and a surface area of the intermediate layer is larger than a surface area of the at least one conductive portion,
- wherein the at least one conductive portion has a predetermined conductive characteristic, the intermediate layer has a first predetermined nonconductive characteristic, and the resin base material has a second predetermined nonconductive characteristic, each of the predetermined conductive and nonconductive characteristics being measurable in order to determine an authenticity of the information recording patch.

5. An information recording patch according to claim 1, wherein said plurality of the first and second conductor adhered regions are arranged in a grid pattern while sandwiching said at least one conductor non-adhered region.

6. An information recording patch according to claim 1, wherein said at least one conductor non-adhered region is sandwiched between each of said first said conductor adhered regions, and is also sandwiched between each of said second conductor regions.

7. An information recording patch according to claim 1, wherein a hologram is formed in said at least a first one of said first and second conductor adhered regions.

8. A printed sheet comprising a sheet to which an information recording patch of claim 1 is pasted.

9. An information recording patch according to claim 2, wherein said plurality of the first and second conductor adhered regions are arranged while sandwiching said at least one conductor non-adhered region.

10. An information recording patch according to claim 3, wherein said plurality of the first and second conductor adhered regions are arranged while sandwiching said at least one conductor non-adhered region.

11. An information recording patch according to claim 2, wherein said plurality of the first and second conductor adhered regions are arranged in a grid pattern while sandwiching said at least one conductor non-adhered region.

12. An information recording patch according to claim 3, wherein said plurality of the first and second conductor adhered regions are arranged in a grid pattern while sandwiching said at least one conductor non-adhered region.

13. An information recording patch according to claim 3, wherein each of the plurality of first conductive portions arranged is arranged in a position separately from others of the first conductive portions on the surface of the intermediate layer, each of the plurality of second conductive portions arranged is arranged in a position separately from others of the second conductive portions on the surface of the intermediate layer, the positions of the first and second conductive portions being measurable in order to determine an authenticity of the information recording patch.

14. An information recording patch comprising:

a first conductor adhered region arranged on a surface of a resin base material, a plurality of second conductor adhered regions arranged on a surface of a resin base material, each of the second conductor adhered regions being spaced apart from each other and from the first conductor adhered region on the surface of the resin base material by at least one conductor non-adhered region, wherein the first conductor adhered region has a long side whose length is $\frac{1}{2}^n$ (n is an integer: n≥0) of a predetermined wavelength, and each of the second conductor adhered regions has a long side that extends in a lengthwise direction is not parallel to a lengthwise direction of the long side of the first conductor adhered region, and the first conductor adhered region is arranged so as to be adjacent to the plurality of the second conductor adhered regions and to be seen as one uniform region.

15. An information recording patch according to claim 14, wherein said first conductor adhered region has one of a rectangular shape and an elliptical shape.

* * * * *